(12) United States Patent
Kuo et al.

(10) Patent No.: US 12,625,623 B2
(45) Date of Patent: May 12, 2026

(54) MULTI-LEVEL MEMORY SYSTEM POWER MANAGEMENT APPARATUS AND METHOD

(71) Applicant: Intel Corporation, Santa Clara, CA (US)

(72) Inventors: Chia-Hung Kuo, Folsom, CA (US); Anoop Mukker, Folsom, CA (US); Eng Hun Ooi, Georgetown (MY); Avishay Snir, Regba (IL); Shrinivas Venkatraman, Folsom, CA (US); Kuan Hua Tan, Coquitlam (CA); Wai Ben Lin, Vancouver (CA)

(73) Assignee: Intel Corporation, Santa Clara, CA (US)

( * ) Notice: Subject to any disclaimer, the term of this patent is extended or adjusted under 35 U.S.C. 154(b) by 225 days.

(21) Appl. No.: 17/128,072

(22) Filed: Dec. 19, 2020

(65) Prior Publication Data

US 2022/0197519 A1     Jun. 23, 2022

(51) Int. Cl.
*G06F 3/06*        (2006.01)

(52) U.S. Cl.
CPC .......... *G06F 3/0625* (2013.01); *G06F 3/0634* (2013.01); *G06F 3/0683* (2013.01)

(58) Field of Classification Search
CPC ..... G06F 3/0625; G06F 3/0634; G06F 3/0683
See application file for complete search history.

(56) References Cited

U.S. PATENT DOCUMENTS

| | | | |
|---|---|---|---|
| 6,618,791 B1 * | 9/2003 | Dodd | G06F 1/3275 711/105 |
| 9,256,268 B2 * | 2/2016 | Wang | G06F 1/3203 |
| 2007/0283178 A1 * | 12/2007 | Dodeja | G06F 1/3203 713/324 |
| 2012/0324258 A1 * | 12/2012 | Branover | G06F 1/3275 713/320 |

(Continued)

OTHER PUBLICATIONS

Eiblmaier, Matthias, Rukun Mao, and Xiaorui Wang. "Power management for main memory with access latency control." International Workshop on Feedback Control Implementation and Design in Computing Systems and Networks. 2009. (Year: 2009).*

(Continued)

*Primary Examiner* — Nicholas J Simonetti
(74) *Attorney, Agent, or Firm* — NICHOLSON DE VOS WEBSTER & ELLIOTT LLP

(57)        ABSTRACT

A multi-level memory architecture scheme to dynamically balance a number of parameters such as power, thermals, cost, latency and performance for memory levels that are progressively further away from the processor in the platform based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or perfor- (Continued)

mance state of the FM for a given time. The power and/or performance state of the memories adaptively change to changing workloads and other parameters even when the processor(s) is in a particular power state.

12 Claims, 5 Drawing Sheets

(56) References Cited

U.S. PATENT DOCUMENTS

| | | | | |
|---|---|---|---|---|
| 2012/0324265 | A1* | 12/2012 | Jeyaseelan | G06F 1/3203 713/320 |
| 2014/0082242 | A1* | 3/2014 | Murphy | G06F 13/24 710/263 |
| 2015/0120978 | A1* | 4/2015 | Kalyanasundharam | G06F 12/1009 710/267 |
| 2015/0363212 | A1* | 12/2015 | Gupta | G06F 9/44505 713/100 |
| 2017/0147429 | A1* | 5/2017 | Motwani | G06F 3/0661 |
| 2017/0160987 | A1* | 6/2017 | Royer, Jr. | G06F 3/0653 |
| 2018/0095674 | A1* | 4/2018 | Alameldeen | G06F 3/064 |
| 2018/0285732 | A1* | 10/2018 | Kurian | G11C 7/22 |
| 2019/0042121 | A1* | 2/2019 | Vergis | G06F 3/0673 |
| 2019/0042157 | A1* | 2/2019 | Bonen | G06F 13/1668 |
| 2019/0073139 | A1* | 3/2019 | Kim | G06F 3/0688 |
| 2019/0361516 | A1* | 11/2019 | Bhattacharyya | G06F 3/0625 |
| 2020/0097201 | A1* | 3/2020 | Irshad | G06F 3/068 |

OTHER PUBLICATIONS

Amaro, Emmanuel, et al. "Can far memory improve job through-put?." Proceedings of the Fifteenth European Conference on Computer Systems. Apr. 2020. (Year: 2020).*
Bojnordi, Mahdi Nazm, and Engin Ipek. "A programmable memory controller for the DDRx interfacing standards." ACM Transactions on Computer Systems (TOCS) 31.4 (2013): 1-31. (Year: 2013).*
Selvan, Vinoth. Adaptive Cache Power Management Strategies. Diss. University of Minnesota, 2016. (Year: 2016).*
Giardino, Michael Joseph. A Software Framework for Application-Guided Power-Aware Control Systems. Diss. Georgia Institute of Technology, 2019. (Year: 2019).*

* cited by examiner

P-unit to determine policy and boundary condition based on platform hints
401

Far memory host controller (FMHC) to dynamically profile workload feeding the far memory and other parameters
402

FMHC to suggest a power state for the far memory based on the workload and other parameters
403

Far memory to enter the suggested power state
404

420

L0s.1

L0s

L1 e.g., 3µS e.g., 9-15µS e.g., 1µS

L0 e.g., 50µS

L1.1

MULTI-LEVEL MEMORY SYSTEM POWER MANAGEMENT APPARATUS AND METHOD

BACKGROUND

Current memory architectures, where power state of a memory is tightly coupled with a processor and/or system-on-chip (SoC) power state, work well for a single-level memory. Here, a single-level memory is a memory which is at a hierarchy above a processor cache. For example, dynamic random-access memory (DRAM) in an SoC which behaves as a main memory for a processor is a single-level memory.

As memory architectures evolve to expand memory beyond the single-level memory (e.g., DRAM) to much denser two-level memory (2LM) with second tier of memory or higher, platforms may not afford tightly coupled power state of the expansion memory to a processor activity state. An example of higher latency storage device is a hard disk drive (HDD), non-volatile off-die memory such as 3Dxpoint™ by Intel Corporation of California, etc. One reason that platforms may not afford tightly coupled power state of the 2LM to a processor activity state is due to significantly higher additive power of the connecting interfaces and the 2LM, and costly thermal solutions to cool down the 2LM. Further, the 2LM may not be arbitrarily placed in a low power state because of the latency, performance and energy penalties associated with the exiting low power state when the processor or IO devices have to access the 2LM.

BRIEF DESCRIPTION OF THE DRAWINGS

The embodiments of the disclosure will be understood more fully from the detailed description given below and from the accompanying drawings of various embodiments of the disclosure, which, however, should not be taken to limit the disclosure to the specific embodiments, but are for explanation and understanding only.

FIG. 2 illustrate a coordinated power management system.

DETAILED DESCRIPTION

Figure 1:
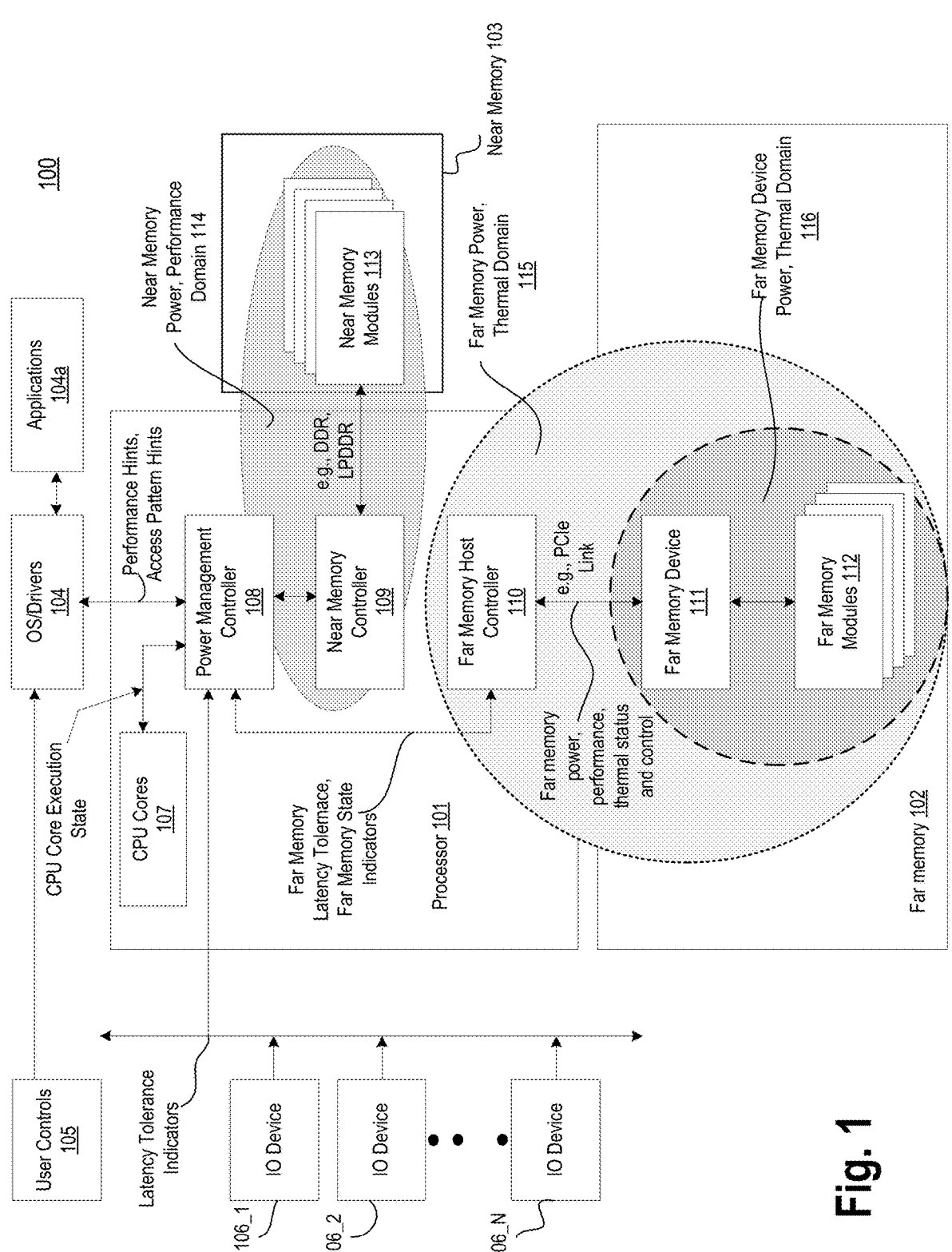
FIG. 1 illustrates a memory management subsystem, in accordance with some embodiments.

Some embodiments describe a multi-level memory architecture scheme to dynamically balance a number of parameters such as power, thermals, cost, latency and performance for memory levels that are progressively further away from the processor in the platform based on how applications are using memory levels that are further away from processor cores. The memory levels include a range of levels extending from a nearest memory level to a most distant memory level. The closest memory level is the cache, followed by level-2 cache, main memory, and so on. Here the most distant memory level is generally referred to as the Far Memory (FM). Various embodiments provide a scheme which comprises a combination of hardware and software to manage power state level of the FM in view of an analysis of the number of parameters. Some embodiments, provide a system solution to manage power, performance, and latency state of the FM sub-system through a combination of system-level hardware and software solutions that create a closed loop architecture where decisions are dynamically adjusted based on current workload needs, access profiles, system and/or device thermal state.

In some embodiments, the decision making for the state of the FM is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. For example, each individual component (e.g., p-unit, NMC, FMHC) makes its decisions based on the information available at its level in a pipeline and co-ordinates the decisions of the components below it in the pipeline. In a pipeline, p-unit is at the lowest level while software running on an Operating system (OS) is at the highest level of the pipeline. Therefore, software is also treated as one of the "components" in this solution as it can receive information from the applications and users directly and, therefore, can provide a higher level of coordination. Other levels in the pipeline include the NMC, FCHC, firmware, and OS.

In some embodiments, an apparatus is provided which includes a plurality of processing cores. The processor cores can be symmetric or asymmetric. The apparatus further comprises a first memory controller (e.g., near memory controller) coupled to one or more first memory modules via a first link (e.g., Double Data Rate (DDR) or Low Power (DDR)). In some embodiments, the apparatus a second memory controller (e.g., a far memory controller) coupled to one or more second memory modules (e.g., level-2 memory) via a second link (e.g., peripheral component interface express (PCIe) link). In some embodiments, the apparatus incudes p-unit coupled to the plurality of processing cores, the first memory controller, and the second memory controller. In some embodiments, the p-unit determines power and/or performance policy (e.g., power and/or performance policy includes Hour of battery life, and quality-of-service) and boundary conditions (e.g., power envelope, thermal limit, and maximum supply current) for the apparatus, and communicates a power state for the first and/or second links via the first memory controller and/or the second memory controller. In some embodiments, the second memory modules have slower exit latency than an exit latency of the first memory modules. In various embodiments, the power state of the first and/or second links is decoupled from power states of the plurality of processing cores.

In some embodiments, the second memory controller manages power of the one or more second memory modules via the second link and based on a dynamic profile of workload fed to a memory device (e.g., far memory device local controller), wherein the memory device is coupled to the second memory modules and the second memory controller. In some embodiments, the memory device has precedence over the second memory controller and/or the power management unit to decide the power state of the second link. In some embodiments, the second memory controller includes a timer to determine exit latency from a power state of the second link, wherein the exit latency is considered by the second memory controller to determine a power state of the second link. In some embodiments, the p-unit receives memory access pattern hints for an operating system, and provides the memory access pattern hints to the second memory controller, wherein the second memory controller considers the memory access pattern hints to determine a power state of the second link.

There are many technical effects of various embodiments. For example, the power and/or performance management technique enables new generation of processor products where products are optimized for power, performance, and/ or thermals for new workloads that take advantage of FM such as a persistent memory architecture. Examples of FM include 3Dxpoint™ by Intel Corporation of California, non-volatile memories such as magnetic random-access memory (MRAM), etc. The scheme of various embodiments allows the memories to enter power and/or performance states which are not in lock-step with the power state of processor core(s) or a processor. The power and/or performance state of the memories adaptively change to changing workloads and other parameters even when the processors or processor cores are in a particular power state. Other technical effects will be evident from the various figures and embodiments.

In the following description, numerous details are discussed to provide a more thorough explanation of embodiments of the present disclosure. It will be apparent, however, to one skilled in the art, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

FIG. 1 illustrates memory management subsystem 100, in accordance with some embodiments. Subsystem 100 comprises processor 101, Far Memory (FM) 102, Near Memory (NM) 103, OS and/or drivers 104, software applications 104a, user control model 105, 10 devices 106_1 through 106_N, processor cores 107, power management controller (p-unit) 108, Near Memory Controller (NMC) 109, Far Memory Host Controller 110 (FMHC), Far Memory Device 111, Far Memory Modules 112, NM modules 113, Near Memory Power and/or Performance Domain 114, Far Memory Power and/or Thermal Domain 115, Far Memory Device Power, and/or Thermal Domain 116. The various interface here may not be actual physical interface but conceptual data and control. In addition, there are additional data and control interfaces between various components that are used to transfer actual data but those are not shown here since they are orthogonal with respect to power, performance, and thermal management.

Figure 5:
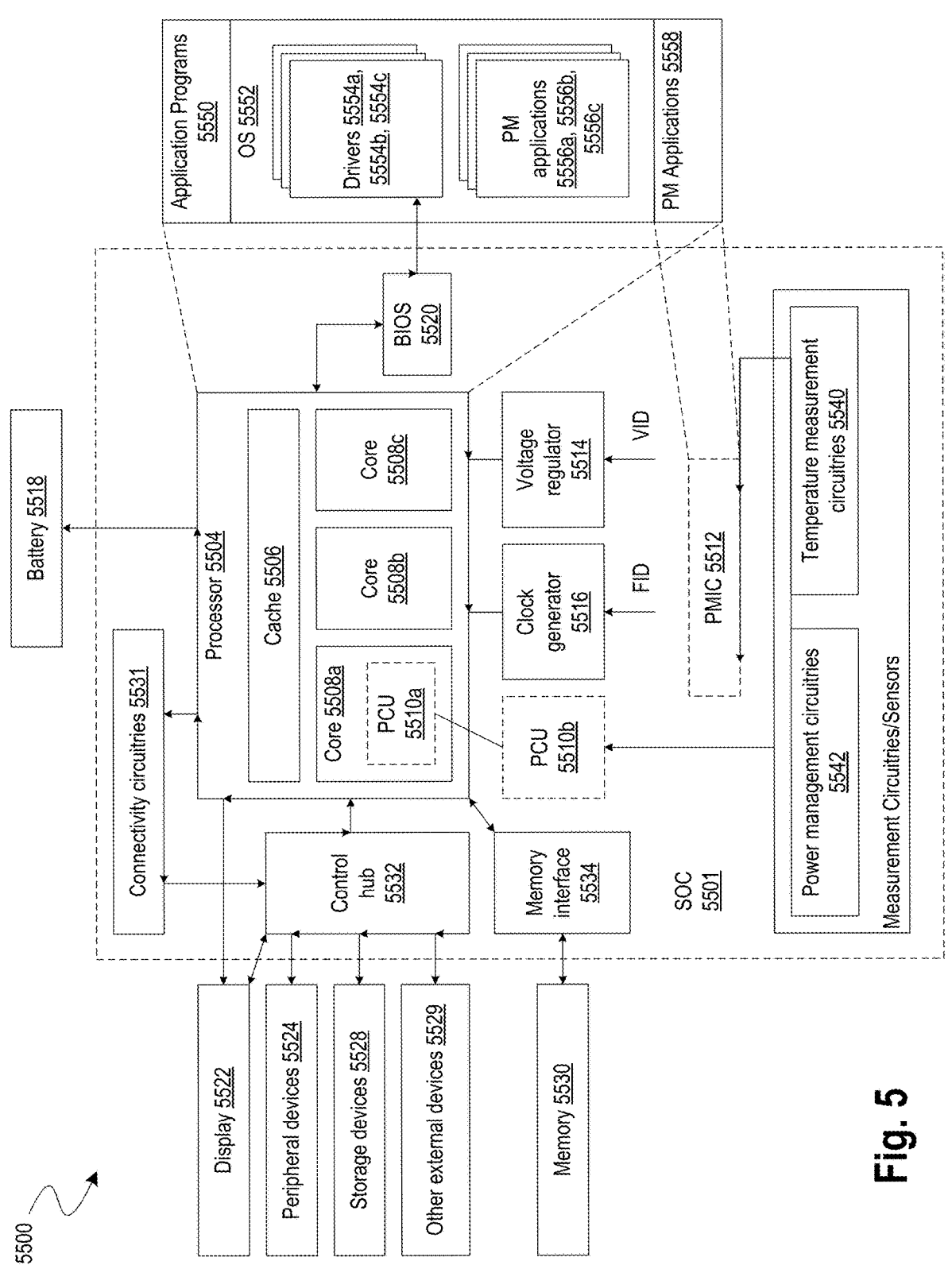
FIG. 5 illustrates a smart device or a computer system or a SoC (System-on-Chip) with decoupled power management system to optimize power thermals and latency, in accordance with some embodiments.

In some embodiments processor 101 is a simplified version of system-on-chip (SoC) of FIG. 5. Processor 101 may include processor cores 107, which may be symmetric or asymmetric. Symmetric cores are identical cores while asymmetric cores have different physical and/or functional performance. For example, asymmetric cores may include a collection of big and small cores. Processor cores 107 may enter into different power states depending on their usage. Each CPU core may include its own power controller unit. In various embodiments, power management unit (p-unit) 108 analyses a number of parameters to determine the power state of each core 107. These parameters include workload of each core, current temperature of each core, operating frequency of each core, workload in the pipeline for each core, power envelope of the computer system, maximum current IccMax of processor 101 and/or each core 107, maximum power of processor 101 and/or each core 107, aging and reliability measures of each core, etc.

P-unit 108 controls the power states of each core 107 and also provides recommendations to NMC 109 and FMHC 110 about power and/or performance states of far memory modules 112 and near memory modules 113. In some embodiments, FMHC 110 provides recommendations to Far Memory Device 111 (another controller) to control power state of Far Memory Modules 112. Examples of near memory modules 113 are double data rate (DDR) compliant memory, low power DDR (LPDDR) compliant memory, static random-access memory (SRAM). Examples of Far Memory Modules 112 include hard disk, magnetic random-access memory, Intel's 3DXpoint memory, etc. In generally, memories with higher memory space, bandwidth but slower exit times from low power state to active state comprise Far Memory Modules 112. Conversely, memories with comparatively lower memory space but faster exit times from low power state to active state comprise Near Memory Modules 113. Any suitable interface may be used to connect to Far Memory Modules 112 and Near Memory Modules 113.

In some embodiments, there are multiple power management domains in the platform including Near Memory Power, Performance Doman 114, Far Memory Device, Thermal Domain 115 and Far Memory Power, Thermal Domain 116. Here the domains are shown by zones of influence in dotted line circles for each controller.

In some embodiments, Far Memory Device, Thermal Domain 116 belongs to the Far Memory Device 111. In general, various embodiments describes two levels of management in domain 115. These levels of management include Device Self-Management and Far Memory Cost Controlled Management. Device Self-Management involves device 111 monitoring its internal power, performance and thermal state and dynamically managing the state to transition through various levels to meet system performance, latency, and thermal expectations. Far Memory Host Controlled Management involves Far Memory Host Controller 110 sending explicit state information to Far Memory Device 111 to force certain state transitions. In some embodiments, in this case, there may be certain device self-decisions that take precedence. For example, if device 111 is in certain thermal conditions, it may choose to ignore certain power state transitions from the FMHC 110.

In some embodiments, Far Memory Power, Thermal Domain 115 comprises the Far Memory Device 111, Far Memory Modules 112, Far Memory Host Controller 110 and any intervening physical interfaces or connecting devices. In some embodiments, Far Memory Host Controller 110 is responsible for management of domain. 115. In some embodiments, FMHC 110 performs power and performance management duties relying on information from various sources. These sources include latency tolerance indicators from IO Devices 106_1 through 106_N (where N is a number), processor core execution state, performance hints and memory access pattern hints from OS and/or drivers 104, far memory latency, tolerance and recommended far memory state indicators.

In some embodiments, workload being fed to the far memory device is profiled by FMHC 110 to decide on the power state that the Far Memory sub-system should be placed in. This algorithm involves profiling idleness period during the workloads and factoring in the power and performance penalties associated with entering a power state. Deeper a power state, higher power savings it provides once the state is entered but, typically, higher the transient energy cost associated with entering and exiting the deeper state.

In some embodiments, FMHC 110 receives latency tolerance hints through P-unit 108 based on the information provided by connected devices (e.g., Universal Serial Bus (USB) devices, display, etc.). In some embodiments, FMHC 110 receives user control 105 to determine power and/or performance state of Far Memory Modules 112. For example, a user is given a choice to select a far memory power profile of their platform based on their use cases. In some embodiments, OS 104 and/or software applications 104a have additional intelligence based on the workloads running on processor cores 107 and provide information to p-unit 108 that tunnels relevant hints to FMHC 110. In some embodiments, processor core execution state is also forwarded from p-unit 108, directly or indirectly as execution state, to FMHC 110 so it can be factored in power and performance decisions of Far Memory sub-system (comprising Far Memory Device 111 and Far Memory Modules 112).

In some embodiments, additional workload information is provided by various components within the sub-system to OS 104 as traffic pattern hints that could allow OS 104 to add more capabilities like moving hot pages from Far Memory Modules 112 to Near Memory Modules 113 to improve overall power profile of the workload. In some embodiments, if there is little activity to Far Memory Modules 112, OS 104 may allow Far Memory Host Controller 110 to place the Far Memory sub-system in very deep power states and dynamically adjust OS access mechanisms to Far Memory Modules 112 to account for much larger latencies when accessing it.

Various embodiments here are described with reference to Cx states for processor states and Lx states for far memory states. Cx states correspond to states defined by the Advanced Configuration and Power Interface (ACPI) Specification (e.g., Version 6.2 Released May 2017), while Lx states pretrain to Peripheral Component Interconnect Express (PCIe) link states. Lx states are loosely referred to as the far memory states because PCIe link connects processor 101 to the Far Memory 102. However, the embodiments are not limited to Cx states and Lx states. Other processor states and memory link states and/or memory power states may be used. For example, P-states, and S-states. In some embodiments, instead and/or in addition to using particular Cx, Lx, P, and/or S states, the multi-level memory can also be managed with reference states that represent responsiveness, computational intensive tasks, background tasks, etc.

C-states the idle (power saving) states. C-state x, Cx, means one or more subsystems of the CPU is at idle, powered down. C-states are states when the CPU has reduced or turned off selected functions. Different processors support different numbers of C-states in which various parts of the CPU are turned off.

P-states, also defined by the ACPI specification, provide a way to scale the frequency and voltage at which the processor runs so as to reduce the power consumption of the CPU. The number of available P-states can be different for each model of CPU, even those from the same family S-states are sleep states defined by the ACPI. S0 is a run or active state. In this state, the machine is fully running S1 is a suspend state. In this state, the CPU suspends activity but retain its contexts. S1 and S3 states are sleep states. In these states, memory contexts are held but CPU contexts are lost. The differences between S2 and S3 are in CPU re-initialization done by firmware and device re-initialization. S4 is a sleep state in which contexts are saved to a disk (e.g., far memory). The context is restored upon the return to S0 state. This is identical to soft-off for hardware. This state can be implemented by either OS or firmware. S5 is a soft-off state. All activity stops and all contexts are lost in this state. C0 is an active state, where CPU/Core is executing instructions. C1 is a Halt state where nothing is being executed, but it can return to C0 instantaneously. C2 is a stop-clock state, similar to C1 but it takes longer time to go back to C0. C3 is a sleep state. A processor can go back to C0 from C3 state, but it will take considerably longer time.

The PCIe defined four link power state levels that are software controlled: fully active state (L0), electrical idle or standby state (L0s), L1 (lower power standby/slumber state), L2 (low power sleep state), and L3 (link Off state).

As links transition from L0 to L3 states, both power saving and exit latencies increase. In the L0 state, the link is fully active in its ready mode and consumes the maximum active power. During short intervals of logical idle in absence of link activities, the link may transition into an L0s state with very low exit latencies (several hundred nanoseconds) for a small power reduction.

In the L1 state, all supplies and all reference clock components are fully active except as permitted by the clock power management when enabled. When the optional internal phase locked loop (PLL) is off or on, transmitter (Tx) and receiver (Rx) may be off or idle, and the common mode keeper remains active. Depending on the number of optional active devices in L1 state, power savings in the L1 standby mode can be limited and does not meet the requirements of mobile market as intended, even though the exit latencies of L1 state could be in the order of microseconds under certain conditions.

In the L2 sleep state, all clocks and main power supplies are turned off, providing the highest idle state power savings. However, exit latencies are very long, in the order of milliseconds, and not acceptable; therefore, the L2 power state is not commonly used in mobile applications.

To reduce power consumption in the L1 idle state with reasonable exit latency targets and without impacting the overall performance of the PCIe link states, PCI-SIG defined two new sub-states as part of the L1 link state. L1 sub-states L1.1 and L1.2 utilize a per-link bi-directional sideband clock request signal, that is required by both ports on the two ends of a link. If both ends of the link are not L1 sub-state capable and enabled, then the link may only operate in the legacy L1 power state.

Internal PLLs no longer have an option to be on and should be turned off in both L1.1 and L1.2, as reference clock inputs are not required in L1 sub-states. Similarly, both the Tx and Rx are turned off and are not required to detect electrical idle in these sub-states. The main difference between L1.1 and L1.2 is the common mode voltage status, as it is maintained in the L1.1 and is turned off in L1.2 sub-state. Therefore, because of the common mode restoration time, exit latency of L1.2 is much longer than L1.1.

Figure 2:
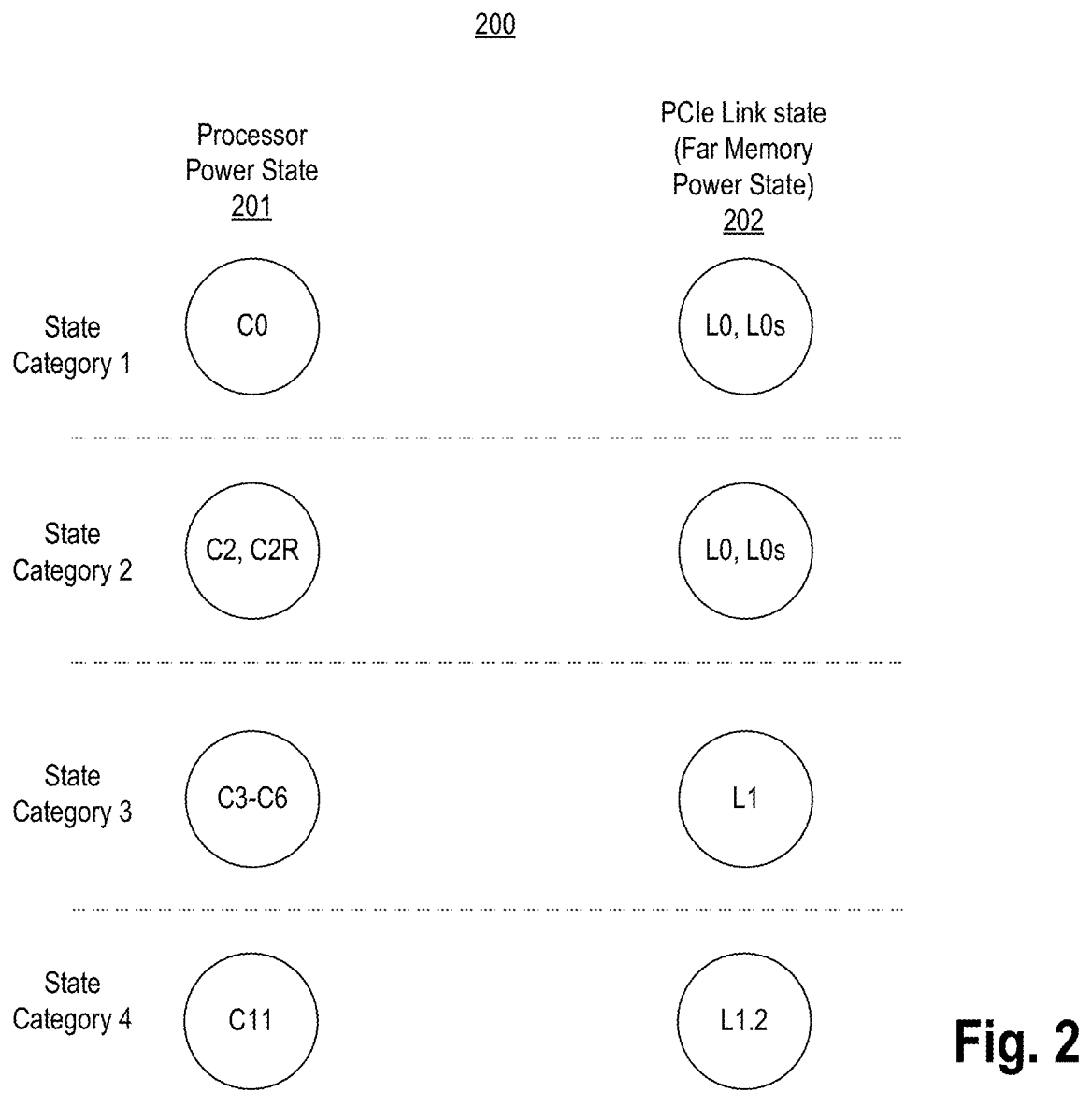

FIG. 2 illustrate a coordinated power management system 200. In a traditional processor system, the power and/or performance state of Far Memory is directly or tightly coupled to the power state of the processor or processor core. In this example, four state categories are shown. However, there can be fewer or more states. The left column provides the power states 201 for a processor or processor core while the right column provides power state 202 for far memory. When the processor is in active state (e.g., C0 state), the far memory power state can be one of L0 or L0s state. When the processor is in C2 or C2R state, the far memory power state can be one of L0 or L0s state. When the processor is in one of C3 through C6 state, the far memory power state is in L1 state. When the processor is in C11 state, the far memory power state is in L1.2 state. This coordinated power management system 200 does not consider current and future workload, activity of memory links, OS based performance hints, etc. In some cases, deeper power states may be available for memory links and far memory but not employed because of the processor may be in the higher active state. As such, performance and power are left wasted. Various embodiments provide a system solution to manage power, performance, and latency state of the FM sub-system through a combination of system-level hardware and software solutions that create a closed loop architecture where decisions are dynamically adjusted based on current workload needs, access profiles, system and/or device thermal state.

Table 1 illustrates one example of the coordinated processor power state and PCIe link state (which translates to far memory state). The latency may vary depending on the far memory device.

TABLE 1

| Processor Cx state | FM state | PCIe link state | FM module state | FM exit latency (µS) |
|---|---|---|---|---|
| C2 | PM1 | L0s | Idle | 1.1 |
| C2R | PM1 | | | |
| C3 | PM2 | L1 | Nap | 10 |
| C6 | PM2 | | | |
| C7 | PM3 | L1.1 | Sleep | 50 |
| C8 | PM3 | | | |
| C9 | PM4 | L1.2 | Sleep+ | 150 |
| C10 | PM4 | | | |
| C11 (S0ix) | PM5 | L1.2 | Deep Sleep | 5700 |
| S3 | PM6 | Off (L2,L3) | Coma | 30000 |
| S4 | OFF | Off | Off | 100000 |

Here, "FM state" refers to the state that is communicated by Far Memory Host Controller 110 in the host to far memory device 111 based on the decisions made by the host. FM State reflects the state of the overall Far Memory Subsystem. Here, "FM Module State" refers to an internal mapping of the host communicated state to the device internal state and components connected to the device e.g. media, power delivery components, etc. FM Module State also refers to the internal state of the FM device 111 and components attached to Far Memory Device 111. In this example, there is a one-to-one mapping between FM state and FM Module State because that is how one implementation turned out to be. However, there could be a different implementation where the same "FM Module State" maps to more than one "FM Device State".

Figure 3:
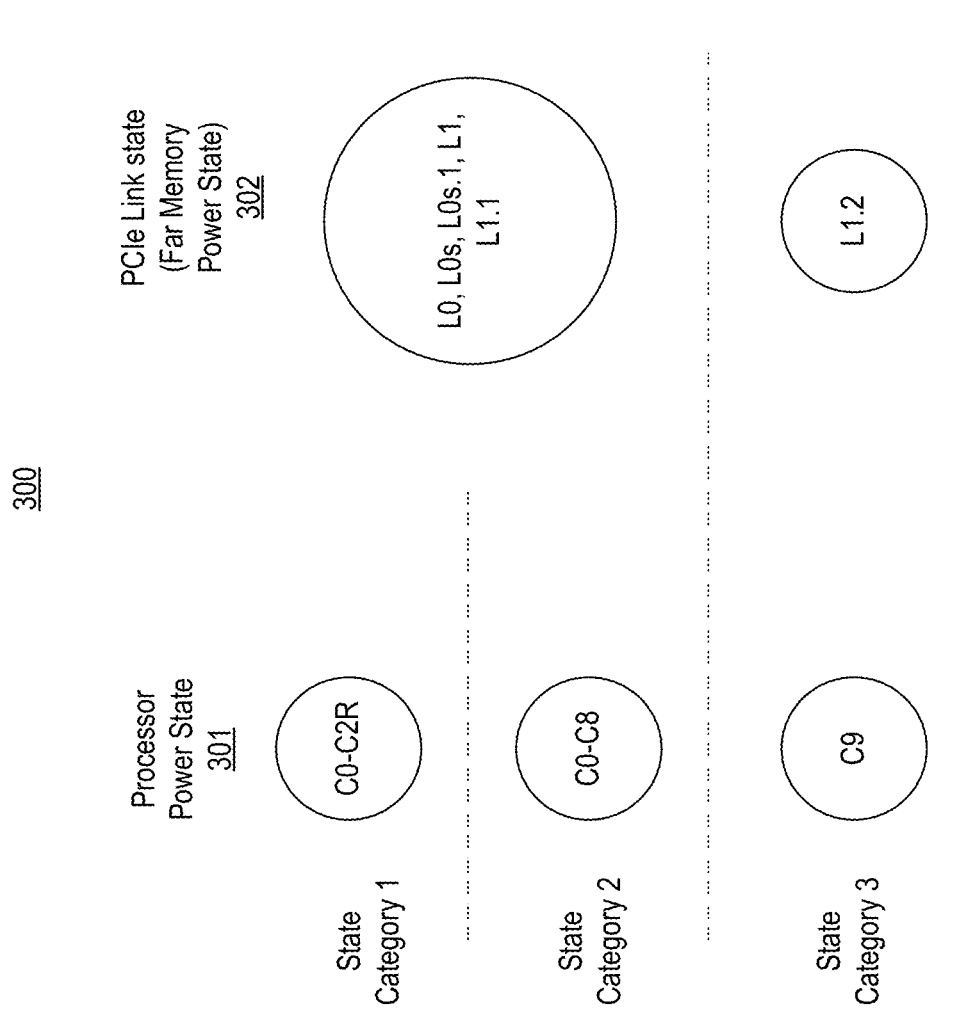
FIG. 3 illustrates a decoupled power management system, in accordance with some embodiments.

FIG. 3 illustrates a decoupled power management system 300, in accordance with some embodiments. Compared to coordinated power management system 200, in various embodiments the power and/or performance state(s) 302 of far memory 102 is decentralized and uncoupled from the power and/or performance state 301 of processor 101 and/or processor cores 107. In this example, decision for a particular PCIe link state 302 for far memory depends on a number of factors and not a mere state of the processor power and/or performance state 301.

In various embodiments, p-unit 108, NMC 109, FMHC 110, and/or Far Memory Device 111 makes decisions about the power and/or performance state of the PCIe link (referred here as FM state) at their respective levels. These decisions are coordinated to provide the most optimum power and/or performance state of the PCIe link for a given time. For example, each individual component (e.g., p-unit 108, NMC 109, FMHC 110, Far Memory Device 111) makes its decisions based on the information available at its level in a pipeline and co-ordinates the decisions of the components below it in the pipeline. As discussed herein, the decision-making process involves dynamically profiling workload feeding far memory 112, latency tolerance hints, use cases, performance hints and/or access pattern hints from OS 104, execution state of processor 107, metrics that indicate how long data is expected to remain in far memory modules 112 before next access, etc.

When the processor is in one of C0 to C2R states, the far memory power state can be one of L0, L0s, L0s.1, L1, or L1.1 state. Each PCI link state has associated exit latency from its state to L0 state. Depending on the various factors discussed herein related to the decision-making process and the exit latencies, PCIe links may transition between various link states to optimize power and/or performance For example, PCI link states may transition from L0s to L0, L0s.1 to L0, and other states based on a timer. The timer may be part of FMHC 110 which determines when to transition from one PCI link state to another based on residency time in that link state. Continuing with the example, when processor is in C9 state, the PCIe link state is in L1.2 state.

Table 2 illustrates one example of the decoupled processor power state and PCIe link state (which translates to far memory state). The latency may vary depending on the far memory device.

TABLE 2

| Cx state of processor 107 | State of Far Memory device 111 | PCIe link state | State of Far Memory module 112 | exit latency in (µS) of FM module 112 |
|---|---|---|---|---|
| C0-C8 | PM0 L0s | L0s | Idle | 1 |
| | PM0 L0s | L0s.1 | Idle | 3 |
| | PM1 | L1 | Deep Idle | 5 |
| | PM2 | L1 | Nap | 15 |
| | PM3 | L1.1 | Sleep | 50 |
| C9 | PM4 | L1.2 | Sleep | 210 |
| C10 | PM4 | L1.2 | Sleep | 210 |
| | PM5 | L1.2 | Deep Sleep | 5700 |
| S3 | Off | Off (L2, L3) | Off | 30000 |
| S4 | Off | Off | Off | 100000 |

From PCIe link power management prospective, p-unit 108 allows FMHC 110 PCIe link state down autonomously to a specific state or enter low power based on its policy and boundary condition and FMHC 110 initiates the link state transition. As described herein, user inputs, connected devices' latency tolerance, OS and Application hints, Far Memory device temperature, and CPU cores' execution state feed into these policies. In some embodiments, FMHC 110 (also referred to as PCIe controller) then reflects the FMHC link states to Far Memory 112. In some embodiments, FMHC 110 houses a dynamic energy tracking mechanism that profiles the workloads for latency and energy cost for various power state transitions. In some embodiments, he dynamic mechanism in FMHC 110 alters the Far Memory sub-system power management policies based on the profile of the current workload and dynamically decides what power state is the best for the workload.

Figure 4:
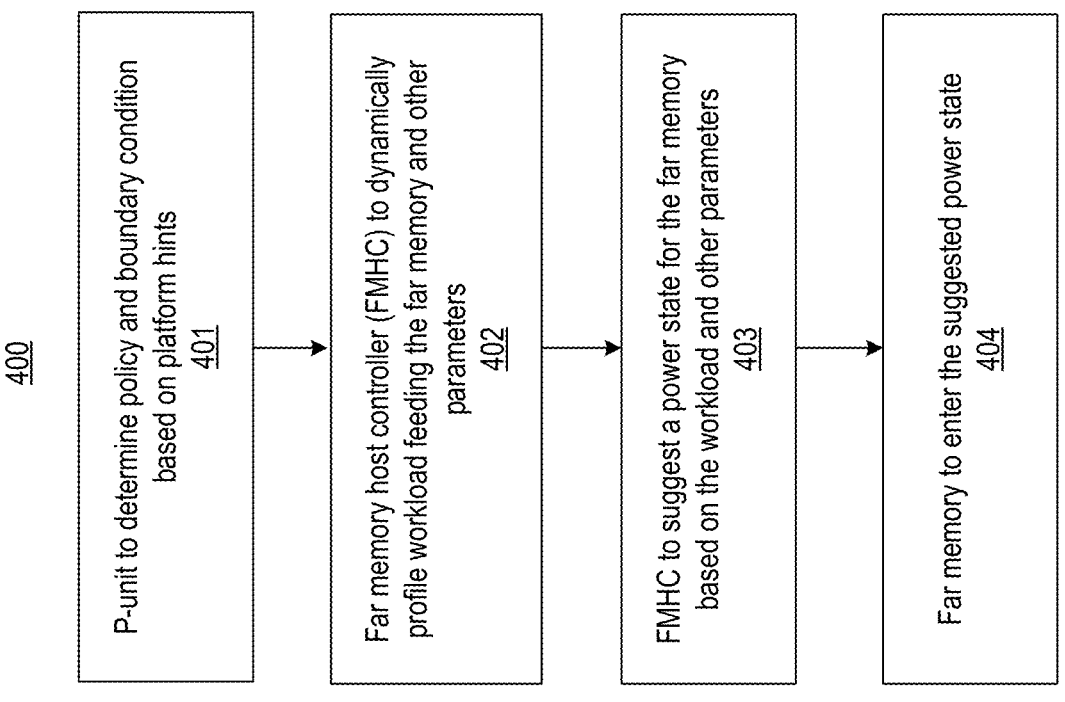
FIG. 4 illustrates a flowchart of decoupled power management system for Hour of battery life (HOBL) and/or workloads with quality-of-service (QoS) requirements, in accordance with some embodiments.
Figure 4:
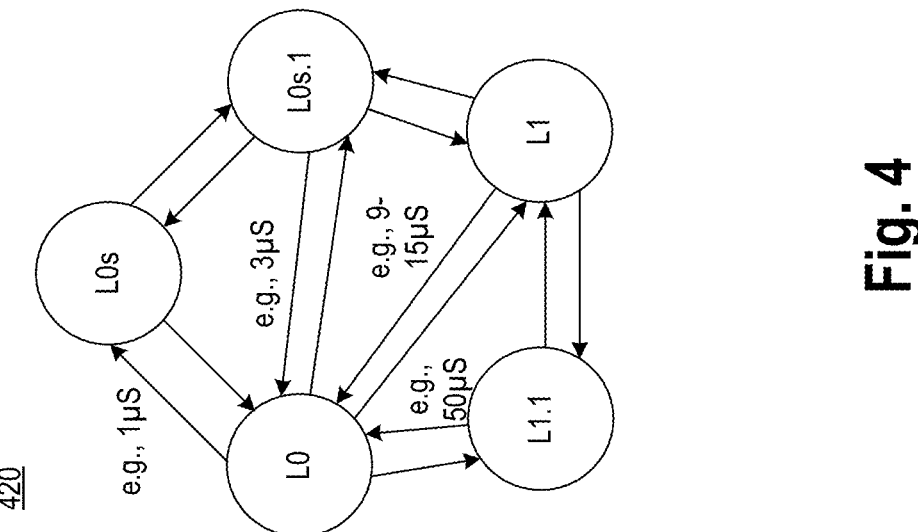

FIG. 4 illustrates flowchart 400 of decoupled power management system for Hour of battery life (HOBL) and/or workloads with quality-of-service (QoS) requirements, in accordance with some embodiments. While various blocks are illustrated in a specific order, the order can be modified. For example, some blocks can be performed before others while some blocks are performed in parallel.

At block 401, p-unit 108 determines policy and boundary condition based on platform hints. In some embodiments, the policy comprises one or more of maximizing Hour of Battery Life (HOBL), quality-of-services (QoS) etc. In some embodiments, the boundary conditions may include the power envelop of the computer system, thermal limitations of the computer system and/or individual cores 107, aging of devices in the system, etc. p-unit 108 collects a host of data from various sensors (e.g., thermal sensors, voltage supply sensors, current sensors, current and future workloads, near and far memory usage for different workloads, hints from OS 104, etc.) to recommend FMHC 110 what the PCIe link state should be. PCIe link state corresponds to the far memory state.

HOBL policy is geared towards preference for power savings at the cost of performance For example, when a computer system is running on battery, then PCIe link states can be selected to achieve less traffic on the PCIe link. In this case, p-unit may rely more on near memory modules 113 for accessing and/or saving data than on Far memory modules 112, for instance. For HoBL workloads with approximately 0% Far Memory activity, the L1.1 power flow achieves lowest link power when CPU cores 107 are active. The deepest power state of L1.1 is chosen to limit the maximum exit latency for memory traffic when the traffic hits far memory 112. However, deeper states are allowed if in a particular implementation, the exit latencies meet the requirements of the system that the implementation is attached to.

QoS is a policy geared towards preference for performance for power savings. For example, when a computer is plugged to an AC/DC power outlet and battery is not the primary source of power supply, p-unit and other controllers may select PCIe links appropriately that provides less exit latency for faster response in executing a workload. For workloads with responsiveness or QoS requirements, the LOs.1 power flow meets 3 us wake requirement (which aligns with memory self-refresh latency) and saves additional power compared to approximately 200 mW platform power of LOs state. In this example, without L0s.1, PCIe link would enter LOs to meet 3 µs. The PCIe link states in chart 420 illustrates the transfer between PCIe link states based on exit latency times. The exit latency times between the PCIe link states are examples for illustrating the decision making process to enter certain PCIe link states.

At block 402, FMHC 110 dynamically profiles workload feeding the far memory and other parameters. In some embodiments, FMHC 110 profiles idleness period during the workloads and factors in the power and performance penalties associated with entering a power state. Deeper a power state, higher power savings it provides once the state is entered but, typically, higher the transient energy cost associated with entering and exiting the deeper state.

At block 403, FMHC 110 suggests a power state for the far memory 111/112 based on the workload and other parameters. In addition to dynamically profiling workload feeding far memory 112, FMHC 110 may also factor in latency tolerance hints from p-unit for various devices attached to the computer system, hints from OS 104 that indicate user usage behavior with reference to an application executing by core(s) 107, processor core execution state etc.

At block 404, far memory 112 enters the suggested power state. In some embodiments, FMHC 110 may suggest a PCIe link state but Far Memory Device 111 (e.g., local controller for Far Memory Modules 112) may decide another plan of action. In that case, the recommendation from Far Memory Device 111 may take precedence over recommendation from p-unit 108 and/or FMHC 110. In some embodiments, p-unit 108 behaves as a supervisor p-unit while near memory controller 109, FMHC 110, and/or Far Memory Device 111 behave as supervisee p-units in view of setting PCIe link states. In some embodiments, Near Memory Controller 109 behaves a as a supervisor p-unit for its domain 115. In some embodiments, FMHC 110 behaves a as a supervisor p-unit for its domain 115. In some embodiments, Memory Device 111 behaves a as a supervisor p-unit for its domain 116.

The scheme of various embodiments allows new computer architectures to be built in a way where legacy workloads, that may have little need to access memory beyond the DRAM based near memory 113, have little impact to battery life in the platforms while allows power, performance, and thermals to be optimized for new workloads that can take advantage of far memory modules 112.

Elements of embodiments (e.g., flowchart with reference to FIG. 4) are also provided as a machine-readable medium (e.g., memory) for storing the computer-executable instructions (e.g., instructions to implement any other processes discussed herein). In some embodiments, computing platform comprises memory, processor, machine-readable storage media (also referred to as tangible machine-readable medium), communication interface (e.g., wireless or wired interface), and network bus coupled together.

In some embodiments, processor is a Digital Signal Processor (DSP), an Application Specific Integrated Circuit (ASIC), a general-purpose Central Processing Unit (CPU), or a low power logic implementing a simple finite state machine to perform the method with reference to FIG. 4 and/or various embodiments, etc.

In some embodiments, the various logic blocks of system are coupled together via a Network Bus. Any suitable protocol may be used to implement the network bus. In some embodiments, machine-readable storage medium includes Instructions (also referred to as the program software code/instructions) for calculating or measuring distance and relative orientation of a device with reference to another device as described with reference to various embodiments and flowchart.

Program software code/instructions associated with flowcharts with reference to FIG. 4 (and/or various embodiments) and executed to implement embodiments of the disclosed subject matter may be implemented as part of an operating system or a specific application, component, program, object, module, routine, or other sequence of instructions or organization of sequences of instructions referred to as "program software code/instructions," "operating system program software code/instructions," "application program software code/instructions," or simply "software" or firmware embedded in processor. In some embodiments, the program software code/instructions associated with flowcharts with reference to FIG. 4 (and/or various embodiments) are executed by system.

In some embodiments, the program software code/instructions associated with reference to FIG. 4 (and/or various embodiments) are stored in a computer executable storage medium and executed by the processor. Here, computer executable storage medium is a tangible machine-readable medium that can be used to store program software code/instructions and data that, when executed by a computing device, causes one or more processors to perform a method(s) as may be recited in one or more accompanying claims directed to the disclosed subject matter.

The tangible machine-readable medium may include storage of the executable software program code/instructions and data in various tangible locations, including for example ROM, volatile RAM, non-volatile memory and/or cache and/or other tangible memory as referenced in the present application. Portions of this program software code/instructions and/or data may be stored in any one of these storage and memory devices. Further, the program software code/instructions can be obtained from other storage, including, e.g., through centralized servers or peer to peer networks and the like, including the Internet. Different portions of the software program code/instructions and data can be obtained at different times and in different communication sessions or in the same communication session.

In some embodiments, the machine-readable storage media includes machine-readable instructions that, when executed, cause one or more machines to perform a method comprising: determining power and/or performance policy and boundary conditions for a processor system; communicating a first power state for a link via a memory controller; dynamically profiling workload feeding a memory device coupled to the memory controller; and suggesting a second power state for the link based on the power and/or performance policy and boundary conditions and dynamically profiled workload. In some embodiments, the power and/or performance policy includes Hour of battery life, and quality of service. In some embodiments, the first power state for the link is same as the second power state for the link. In some embodiments, the first power state for the link is different as the second power state for the link. In some embodiments, the second power state takes precedence over the first power state. In some embodiments, the machine-readable storage media includes further machine-readable instructions that, when executed, cause the one or more machines to perform the method comprising determining exit latency from a power state of the second link; and considering, by the memory controller, the exit latency to determine a power state of the second link.

The software program code/instructions (associated with reference to FIG. 4 and other embodiments) and data can be obtained in their entirety prior to the execution of a respective software program or application by the computing device. Alternatively, portions of the software program code/instructions and data can be obtained dynamically, e.g., just in time, when needed for execution. Alternatively, some combination of these ways of obtaining the software program code/instructions and data may occur, e.g., for different applications, components, programs, objects, modules, routines or other sequences of instructions or organization of sequences of instructions, by way of example. Thus, it is not required that the data and instructions be on a tangible machine readable medium in entirety at a particular instance of time.

Examples of tangible computer-readable media include but are not limited to recordable and non-recordable type media such as volatile and non-volatile memory devices, read only memory (ROM), random access memory (RAM), flash memory devices, floppy and other removable disks, magnetic storage media, optical storage media (e.g., Compact Disk Read-Only Memory (CD ROMS), Digital Versatile Disks (DVDs), etc.), among others. The software program code/instructions may be temporarily stored in digital tangible communication links while implementing electrical, optical, acoustical or other forms of propagating signals, such as carrier waves, infrared signals, digital signals, etc. through such tangible communication links.

In general, tangible machine readable medium includes any tangible mechanism that provides (i.e., stores and/or transmits in digital form, e.g., data packets) information in a form accessible by a machine (i.e., a computing device), which may be included, e.g., in a communication device, a computing device, a network device, a personal digital assistant, a manufacturing tool, a mobile communication device, whether or not able to download and run applications and subsidized applications from the communication network, such as the Internet, e.g., an iPhone®, Galaxy®, or the like, or any other device including a computing device. In one embodiment, processor-based system is in a form of or included within a PDA (personal digital assistant), a cellular phone, a notebook computer, a tablet, a game console, a set top box, an embedded system, a TV (television), a personal desktop computer, etc. Alternatively, the traditional communication applications and subsidized application(s) may be used in some embodiments of the disclosed subject matter.

FIG. 5 illustrates a smart device or a computer system or a SoC (System-on-Chip) with decoupled power management system to optimize power thermals and latency, in accordance with some embodiments.

It is pointed out that those elements of FIG. 5 having the same reference numbers (or names) as the elements of any other figure may operate or function in any manner similar to that described, but are not limited to such. Any block in this smart device can have the apparatus for dynamically optimizing battery charging voltage.

In some embodiments, device 5500 represents an appropriate computing device, such as a computing tablet, a mobile phone or smart-phone, a laptop, a desktop, an Internet-of-Things (IOT) device, a server, a wearable device, a set-top box, a wireless-enabled e-reader, or the like. It will be understood that certain components are shown generally, and not all components of such a device are shown in device 5500.

In an example, the device 5500 comprises an SoC (System-on-Chip) 5501. An example boundary of the SoC 5501 is illustrated using dotted lines in FIG. 5, with some example components being illustrated to be included within SoC 5501—however, SoC 5501 may include any appropriate components of device 5500.

In some embodiments, device 5500 includes processor 5504. Processor 5504 can include one or more physical devices, such as microprocessors, application processors, microcontrollers, programmable logic devices, processing cores, or other processing implementations such as disaggregated combinations of multiple compute, graphics, accelerator, I/O and/or other processing chips. The processing operations performed by processor 5504 include the execution of an operating platform or operating system on which applications and/or device functions are executed. The processing operations include operations related to I/O (input/output) with a human user or with other devices, operations related to power management, operations related to connecting computing device 5500 to another device, and/or the like. The processing operations may also include operations related to audio I/O and/or display I/O.

In some embodiments, processor 5504 includes multiple processing cores (also referred to as cores) 5508a, 5508b, 5508c. Although merely three cores 5508a, 5508b, 5508c are illustrated in FIG. 5, processor 5504 may include any other appropriate number of processing cores, e.g., tens, or even hundreds of processing cores. Processor cores 5508a, 5508b, 5508c may be implemented on a single integrated circuit (IC) chip. Moreover, the chip may include one or more shared and/or private caches, buses or interconnections, graphics and/or memory controllers, or other components.

In some embodiments, processor 5504 includes cache 5506. In an example, sections of cache 5506 may be dedicated to individual cores 5508 (e.g., a first section of cache 5506 dedicated to core 5508a, a second section of cache 5506 dedicated to core 5508b, and so on). In an example, one or more sections of cache 5506 may be shared among two or more of cores 5508. Cache 5506 may be split in different levels, e.g., level 1 (L1) cache, level 2(L2) cache, level 3(L3) cache, etc.

In some embodiments, processor core 5504 may include a fetch unit to fetch instructions (including instructions with conditional branches) for execution by the core 5504. The instructions may be fetched from any storage devices such as the memory 5530. Processor core 5504 may also include a decode unit to decode the fetched instruction. For example, the decode unit may decode the fetched instruction into a plurality of micro-operations. Processor core 5504 may include a schedule unit to perform various operations associated with storing decoded instructions. For example, the schedule unit may hold data from the decode unit until the instructions are ready for dispatch, e.g., until all source values of a decoded instruction become available. In one embodiment, the schedule unit may schedule and/or issue (or dispatch) decoded instructions to an execution unit for execution.

The execution unit may execute the dispatched instructions after they are decoded (e.g., by the decode unit) and dispatched (e.g., by the schedule unit). In an embodiment, the execution unit may include more than one execution unit (such as an imaging computational unit, a graphics computational unit, a general-purpose computational unit, etc.). The execution unit may also perform various arithmetic operations such as addition, subtraction, multiplication, and/or division, and may include one or more an arithmetic logic units (ALUs). In an embodiment, a co-processor (not shown) may perform various arithmetic operations in conjunction with the execution unit.

Further, execution unit may execute instructions out-of-order. Hence, processor core 5504 may be an out-of-order processor core in one embodiment. Processor core 5504 may also include a retirement unit. The retirement unit may retire executed instructions after they are committed. In an embodiment, retirement of the executed instructions may result in processor state being committed from the execution of the instructions, physical registers used by the instructions being de-allocated, etc. Processor core 5504 may also include a bus unit to enable communication between components of processor core 5504 and other components via one or more buses. Processor core 5504 may also include one or more registers to store data accessed by various components of the core 5504 (such as values related to assigned app priorities and/or sub-system states (modes) association.

In some embodiments, device 5500 comprises connectivity circuitries 5531. For example, connectivity circuitries 5531 includes hardware devices (e.g., wireless and/or wired connectors and communication hardware) and/or software components (e.g., drivers, protocol stacks), e.g., to enable device 5500 to communicate with external devices. Device 5500 may be separate from the external devices, such as other computing devices, wireless access points or base stations, etc.

In an example, connectivity circuitries 5531 may include multiple different types of connectivity. To generalize, the connectivity circuitries 5531 may include cellular connectivity circuitries, wireless connectivity circuitries, etc. Cellular connectivity circuitries of connectivity circuitries 5531 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, 3rd Generation Partnership Project (3GPP) Universal Mobile Telecommunications Systems (UMTS) system or variations or derivatives, 3GPP Long-Term Evolution (LTE) system or variations or derivatives, 3GPP LTE-Advanced (LTE-A) system or variations or derivatives, Fifth Generation (5G) wireless system or variations or derivatives, 5G mobile networks system or variations or derivatives, 5G New Radio (NR) system or variations or derivatives, or other cellular service standards. Wireless connectivity circuitries (or wireless interface) of the connectivity circuitries 5531 refers to wireless connectivity that is not cellular, and can include personal area networks (such as Bluetooth, Near Field, etc.), local area networks (such as Wi-Fi), and/or wide area networks (such as WiMax), and/or other wireless communication. In an example, connectivity circuitries 5531 may include a network interface, such as a wired or wireless interface, e.g., so that a system embodiment may be incorporated into a wireless device, for example, a cell phone or personal digital assistant.

In some embodiments, device 5500 comprises control hub 5532, which represents hardware devices and/or software components related to interaction with one or more I/O devices. For example, processor 5504 may communicate with one or more of display 5522, one or more peripheral devices 5524, storage devices 5528, one or more other external devices 5529, etc., via control hub 5532. Control hub 5532 may be a chipset, a Platform Control Hub (PCH), and/or the like.

For example, control hub 5532 illustrates one or more connection points for additional devices that connect to device 5500, e.g., through which a user might interact with the system. For example, devices (e.g., devices 5529) that can be attached to device 5500 include microphone devices, speaker or stereo systems, audio devices, video systems or other display devices, keyboard or keypad devices, or other I/O devices for use with specific applications such as card readers or other devices.

As mentioned above, control hub 5532 can interact with audio devices, display 5522, etc. For example, input through a microphone or other audio device can provide input or commands for one or more applications or functions of device 5500. Additionally, audio output can be provided instead of, or in addition to display output. In another example, if display 5522 includes a touch screen, display 5522 also acts as an input device, which can be at least partially managed by control hub 5532. There can also be additional buttons or switches on computing device 5500 to provide I/O functions managed by control hub 5532. In one embodiment, control hub 5532 manages devices such as accelerometers, cameras, light sensors or other environmental sensors, or other hardware that can be included in device 5500. The input can be part of direct user interaction, as well as providing environmental input to the system to influence its operations (such as filtering for noise, adjusting displays for brightness detection, applying a flash for a camera, or other features).

In some embodiments, control hub 5532 may couple to various devices using any appropriate communication protocol, e.g., PCIe (Peripheral Component Interconnect Express), USB (Universal Serial Bus), Thunderbolt, High Definition Multimedia Interface (HDMI), Firewire, etc.

In some embodiments, display 5522 represents hardware (e.g., display devices) and software (e.g., drivers) components that provide a visual and/or tactile display for a user to interact with device 5500. Display 5522 may include a display interface, a display screen, and/or hardware device used to provide a display to a user. In some embodiments, display 5522 includes a touch screen (or touch pad) device that provides both output and input to a user. In an example, display 5522 may communicate directly with the processor 5504. Display 5522 can be one or more of an internal display device, as in a mobile electronic device or a laptop device or an external display device attached via a display interface (e.g., DisplayPort, etc.). In one embodiment display 5522 can be a head mounted display (HMD) such as a stereoscopic display device for use in virtual reality (VR) applications or augmented reality (AR) applications.

In some embodiments, and although not illustrated in the figure, in addition to (or instead of) processor 5504, device 5500 may include Graphics Processing Unit (GPU) comprising one or more graphics processing cores, which may control one or more aspects of displaying contents on display 5522.

Control hub 5532 (or platform controller hub) may include hardware interfaces and connectors, as well as software components (e.g., drivers, protocol stacks) to make peripheral connections, e.g., to peripheral devices 5524.

It will be understood that device 5500 could both be a peripheral device to other computing devices, as well as have peripheral devices connected to it. Device 5500 may have a "docking" connector to connect to other computing devices for purposes such as managing (e.g., downloading and/or uploading, changing, synchronizing) content on device 5500. Additionally, a docking connector can allow device 5500 to connect to certain peripherals that allow computing device 5500 to control content output, for example, to audiovisual or other systems.

In addition to a proprietary docking connector or other proprietary connection hardware, device 5500 can make peripheral connections via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other types.

In some embodiments, connectivity circuitries 5531 may be coupled to control hub 5532, e.g., in addition to, or instead of, being coupled directly to the processor 5504. In some embodiments, display 5522 may be coupled to control hub 5532, e.g., in addition to, or instead of, being coupled directly to processor 5504.

In some embodiments, device 5500 comprises memory 5530 coupled to processor 5504 via memory interface 5534. Memory 5530 includes memory devices for storing information in device 5500.

In some embodiments, memory 5530 includes apparatus to maintain stable clocking as described with reference to various embodiments. Memory can include nonvolatile (state does not change if power to the memory device is interrupted) and/or volatile (state is indeterminate if power to the memory device is interrupted) memory devices. Memory device 5530 can be a dynamic random-access memory (DRAM) device, a static random-access memory (SRAM) device, flash memory device, phase-change memory device, or some other memory device having suitable performance to serve as process memory. In one embodiment, memory 5530 can operate as system memory for device 5500, to store data and instructions for use when the one or more processors 5504 executes an application or process. Memory 5530 can store application data, user data, music, photos, documents, or other data, as well as system data (whether long-term or temporary) related to the execution of the applications and functions of device 5500.

Elements of various embodiments and examples are also provided as a machine-readable medium (e.g., memory 5530) for storing the computer-executable instructions (e.g., instructions to implement any other processes discussed herein). The machine-readable medium (e.g., memory 5530) may include, but is not limited to, flash memory, optical disks, CD-ROMs, DVD ROMs, RAMs, EPROMs, EEPROMs, magnetic or optical cards, phase change memory (PCM), or other types of machine-readable media suitable for storing electronic or computer-executable instructions. For example, embodiments of the disclosure may be downloaded as a computer program (e.g., BIOS) which may be transferred from a remote computer (e.g., a server) to a requesting computer (e.g., a client) by way of data signals via a communication link (e.g., a modem or network connection).

In some embodiments, device 5500 comprises temperature measurement circuitries 5540, e.g., for measuring temperature of various components of device 5500. In an example, temperature measurement circuitries 5540 may be embedded, or coupled or attached to various components, whose temperature are to be measured and monitored. For example, temperature measurement circuitries 5540 may measure temperature of (or within) one or more of cores 5508a, 5508b, 5508c, voltage regulator 5514, memory 5530, a mother-board of SoC 5501, and/or any appropriate component of device 5500. In some embodiments, temperature measurement circuitries 5540 include a low power hybrid reverse (LPHR) bandgap reference (BGR) and digital temperature sensor (DTS), which utilizes subthreshold metal oxide semiconductor (MOS) transistor and the PNP parasitic Bi-polar Junction Transistor (BJT) device to form a reverse BGR that serves as the base for configurable BGR or DTS operating modes. The LPHR architecture uses low-cost MOS transistors and the standard parasitic PNP device. Based on a reverse bandgap voltage, the LPHR can work as a configurable BGR. By comparing the configurable BGR with the scaled base-emitter voltage, the circuit can also perform as a DTS with a linear transfer function with single-temperature trim for high accuracy.

In some embodiments, device 5500 comprises power measurement circuitries 5542, e.g., for measuring power consumed by one or more components of the device 5500. In an example, in addition to, or instead of, measuring power, the power measurement circuitries 5542 may measure voltage and/or current. In an example, the power measurement circuitries 5542 may be embedded, or coupled or attached to various components, whose power, voltage, and/or current consumption are to be measured and monitored. For example, power measurement circuitries 5542 may measure power, current and/or voltage supplied by one or more voltage regulators 5514, power supplied to SoC 5501, power supplied to device 5500, power consumed by processor 5504 (or any other component) of device 5500, etc.

In some embodiments, device 5500 comprises one or more voltage regulator circuitries, generally referred to as voltage regulator (VR) 5514. VR 5514 generates signals at appropriate voltage levels, which may be supplied to operate any appropriate components of the device 5500. Merely as an example, VR 5514 is illustrated to be supplying signals to processor 5504 of device 5500. In some embodiments, VR 5514 receives one or more Voltage Identification (VID) signals, and generates the voltage signal at an appropriate level, based on the VID signals. Various type of VRs may be utilized for the VR 5514. For example, VR 5514 may include a "buck" VR, "boost" VR, a combination of buck and boost VRs, low dropout (LDO) regulators, switching DC-DC regulators, constant-on-time controller-based DC-DC regulator, etc. Buck VR is generally used in power delivery applications in which an input voltage needs to be transformed to an output voltage in a ratio that is smaller than unity. Boost VR is generally used in power delivery applications in which an input voltage needs to be transformed to an output voltage in a ratio that is larger than unity. In some embodiments, each processor core has its own VR, which is controlled by PCU 5510a/b and/or PMIC 5512. In some embodiments, each core has a network of distributed LDOs to provide efficient control for power management. The LDOs can be digital, analog, or a combination of digital or analog LDOs. In some embodiments, VR 5514 includes current tracking apparatus to measure current through power supply rail(s).

In some embodiments, VR 5514 includes a digital control scheme to manage states of a proportional-integral-derivative (PID) filter (also known as a digital Type-III compensator). The digital control scheme controls the integrator of the PID filter to implement non-linear control of saturating the duty cycle during which the proportional and derivative terms of the PID are set to 0 while the integrator and its internal states (previous values or memory) is set to a duty cycle that is the sum of the current nominal duty cycle plus a deltaD. The deltaD is the maximum duty cycle increment that is used to regulate a voltage regulator from ICCmin to ICCmax and is a configuration register that can be set post silicon. A state machine moves from a non-linear all ON state (which brings the output voltage Vout back to a regulation window) to an open loop duty cycle which maintains the output voltage slightly higher than the required reference voltage Vref. After a certain period in this state of open loop at the commanded duty cycle, the state machine then ramps down the open loop duty cycle value until the output voltage is close to the Vref commanded. As such, output chatter on the output supply from VR 5514 is completely eliminated (or substantially eliminated) and there is merely a single undershoot transition which could lead to a guaranteed Vmin based on a comparator delay and the di/dt of the load with the available output decoupling capacitance.

In some embodiments, VR 5514 includes a separate self-start controller, which is functional without fuse and/or trim information. The self-start controller protects VR 5514 against large inrush currents and voltage overshoots, while being capable of following a variable VID (voltage identification) reference ramp imposed by the system. In some embodiments, the self-start controller uses a relaxation oscillator built into the controller to set the switching frequency of the buck converter. The oscillator can be initialized using either a clock or current reference to be close to a desired operating frequency. The output of VR 5514 is coupled weakly to the oscillator to set the duty cycle for closed loop operation. The controller is naturally biased such that the output voltage is always slightly higher than the set point, eliminating the need for any process, voltage, and/or temperature (PVT) imposed trims.

In some embodiments, device 5500 comprises one or more clock generator circuitries, generally referred to as clock generator 5516. Clock generator 5516 generates clock signals at appropriate frequency levels, which may be supplied to any appropriate components of device 5500. Merely as an example, clock generator 5516 is illustrated to be supplying clock signals to processor 5504 of device 5500. In some embodiments, clock generator 5516 receives one or more Frequency Identification (FID) signals, and generates the clock signals at an appropriate frequency, based on the FID signals.

In some embodiments, device 5500 comprises battery 5518 supplying power to various components of device 5500. Merely as an example, battery 5518 is illustrated to be supplying power to processor 5504. Although not illustrated in the figures, device 5500 may comprise a charging circuitry, e.g., to recharge the battery, based on Alternating Current (AC) power supply received from an AC adapter.

In some embodiments, battery 5518 periodically checks an actual battery capacity or energy with charge to a preset voltage (e.g., 4.1 V). The battery then decides of the battery capacity or energy. If the capacity or energy is insufficient, then an apparatus in or associated with the battery slightly increases charging voltage to a point where the capacity is sufficient (e.g. from 4.1 V to 4.11 V). The process of periodically checking and slightly increase charging voltage is performed until charging voltage reaches specification limit (e.g., 4.2 V). The scheme described herein has benefits such as battery longevity can be extended, risk of insufficient energy reserve can be reduced, burst power can be used as long as possible, and/or even higher burst power can be used.

In some embodiments, the charging circuitry (e.g., 5518) comprises a buck-boost converter. This buck-boost converter comprises DrMOS or DrGaN devices used in place of half-bridges for traditional buck-boost converters. Various embodiments here are described with reference to DrMOS. However, the embodiments are applicable to DrGaN. The DrMOS devices allow for better efficiency in power conversion due to reduced parasitic and optimized MOSFET packaging. Since the dead-time management is internal to the DrMOS, the dead-time management is more accurate than for traditional buck-boost converters leading to higher efficiency in conversion. Higher frequency of operation allows for smaller inductor size, which in turn reduces the z-height of the charger comprising the DrMOS based buck-boost converter. The buck-boost converter of various embodiments comprises dual-folded bootstrap for DrMOS devices. In some embodiments, in addition to the traditional bootstrap capacitors, folded bootstrap capacitors are added that cross-couple inductor nodes to the two sets of DrMOS switches.

In some embodiments, device 5500 comprises Power Control Unit (PCU) 5510 (also referred to as Power Management Unit (PMU), Power Management Controller (PMC), Power Unit (p-unit), etc.). In an example, some sections of PCU 5510 may be implemented by one or more processing cores 5508, and these sections of PCU 5510 are symbolically illustrated using a dotted box and labelled PCU 5510*a*. In an example, some other sections of PCU 5510 may be implemented outside the processing cores 5508, and these sections of PCU 5510 are symbolically illustrated using a dotted box and labelled as PCU 5510*b*. PCU 5510 may implement various power management operations for device 5500. PCU 5510 may include hardware interfaces, hardware circuitries, connectors, registers, etc., as well as software components (e.g., drivers, protocol stacks), to implement various power management operations for device 5500.

In various embodiments, PCU or PMU 5510 is organized in a hierarchical manner forming a hierarchical power management (HPM). HPM of various embodiments builds a capability and infrastructure that allows for package level management for the platform, while still catering to islands of autonomy that might exist across the constituent die in the package. HPM does not assume a pre-determined mapping of physical partitions to domains. An HPM domain can be aligned with a function integrated inside a dielet, to a dielet boundary, to one or more dielets, to a companion die, or even a discrete CXL device. HPM addresses integration of multiple instances of the same die, mixed with proprietary functions or 3rd party functions integrated on the same die or separate die, and even accelerators connected via CXL (e.g., Flexbus) that may be inside the package, or in a discrete form factor.

HPM enables designers to meet the goals of scalability, modularity, and late binding. HPM also allows PMU functions that may already exist on other dice to be leveraged, instead of being disabled in the flat scheme. HPM enables management of any arbitrary collection of functions independent of their level of integration. HPM of various embodiments is scalable, modular, works with symmetric multi-chip processors (MCPs), and works with asymmetric MCPs. For example, HPM does not need a signal PM controller and package infrastructure to grow beyond reasonable scaling limits. HPM enables late addition of a die in a package without the need for change in the base die infrastructure. HPM addresses the need of disaggregated solutions having dies of different process technology nodes coupled in a single package. HPM also addresses the needs of companion die integration solutions—on and off package.

In various embodiments, each die (or dielet) includes a power management unit (PMU) or p-unit. For example, processor dies can have a supervisor p-unit, supervisee p-unit, or a dual role supervisor/supervisee p-unit. In some embodiments, an I/O die has its own dual role p-unit such as supervisor and/or supervisee p-unit. The p-units in each die can be instances of a generic p-unit. In one such example, all p-units have the same capability and circuits, but are configured (dynamically or statically) to take a role of a supervisor, supervisee, and/or both. In some embodiments, the p-units for compute dies are instances of a compute p-unit while p-units for IO dies are instances of an IO p-unit different from the compute p-unit. Depending on the role, p-unit acquires specific responsibilities to manage power of the multichip module and/or computing platform. While various p-units are described for dies in a multichip module or system-on-chip, a p-unit can also be part of an external device such as I/O device.

Here, the various p-units do not have to be the same. The HPM architecture can operate very different types of p-units. One common feature for the p-units is that they are expected to receive HPM messages and are expected to be able to comprehend them. In some embodiments, the p-unit of IO dies may be different than the p-unit of the compute dies. For example, the number of register instances of each class of register in the IO p-unit is different than those in the p-units of the compute dies. An IO die has the capability of being an HPM supervisor for CXL connected devices, but compute die may not need to have that capability. The IO and computes dice also have different firmware flows and possibly different firmware images. These are choices that an implementation can make. An HPM architecture can choose to have one superset firmware image and selectively execute flows that are relevant to the die type the firmware is associated with. Alternatively, there can be a customer firmware for each p-unit type; it can allow for more streamlined sizing of the firmware storage requirements for each p-unit type.

The p-unit in each die can be configured as a supervisor p-unit, supervisee p-unit or with a dual role of supervisor/supervisee. As such, p-units can perform roles of supervisor or supervisee for various domains. In various embodiments, each instance of p-unit is capable of autonomously managing local dedicated resources and contains structures to aggregate data and communicate between instances to enable shared resource management by the instance configured as the shared resource supervisor. A message and wire-based infrastructure is provided that can be duplicated and configured to facilitate management and flows between multiple p-units.

In some embodiments, power and thermal thresholds are communicated by a supervisor p-unit to supervisee p-units. For example, a supervisor p-unit learns of the workload (present and future) of each die, power measurements of each die, and other parameters (e.g., platform level power boundaries) and determines new power limits for each die. These power limits are then communicated by supervisor p-units to the supervisee p-units via one or more interconnects and fabrics. In some embodiments, a fabric indicates a group of fabrics and interconnect including a first fabric, a second fabric, and a fast response interconnect. In some embodiments, the first fabric is used for common communication between a supervisor p-unit and a supervisee p-unit. These common communications include change in voltage, frequency, and/or power state of a die which is planned based on a number of factors (e.g., future workload, user behavior, etc.). In some embodiments, the second fabric is used for higher priority communication between supervisor p-unit and supervisee p-unit. Example of higher priority communication include a message to throttle because of a possible thermal runaway condition, reliability issue, etc. In some embodiments, a fast response interconnect is used for communicating fast or hard throttle of all dies. In this case, a supervisor p-unit may send a fast throttle message to all other p-units, for example. In some embodiments, a fast response interconnect is a legacy interconnect whose function can be performed by the second fabric.

The HPM architecture of various embodiments enables scalability, modularity, and late binding of symmetric and/or asymmetric dies. Here, symmetric dies are dies of same size, type, and/or function, while asymmetric dies are dies of different size, type, and/or function. Hierarchical approach also allows PMU functions that may already exist on other dice to be leveraged, instead of being disabled in the traditional flat power management scheme. HPM does not assume a pre-determined mapping of physical partitions to domains. An HPM domain can be aligned with a function integrated inside a dielet, to a dielet boundary, to one or more dielets, to a companion die, or even a discrete CXL device. HPM enables management of any arbitrary collection of functions independent of their level of integration. In some embodiments, a p-unit is declared a supervisor p-unit based on one or more factors. These factors include memory size, physical constraints (e.g., number of pin-outs), and locations of sensors (e.g., temperature, power consumption, etc.) to determine physical limits of the processor.

The HPM architecture of various embodiments, provides a means to scale power management so that a single p-unit instance does not need to be aware of the entire processor. This enables power management at a smaller granularity and improves response times and effectiveness. Hierarchical structure maintains a monolithic view to the user. For example, at an operating system (OS) level, HPM architecture gives the OS a single PMU view even though the PMU is physically distributed in one or more supervisor-supervisee configurations.

In some embodiments, the HPM architecture is centralized where one supervisor controls all supervisees. In some embodiments, the HPM architecture is decentralized, wherein various p-units in various dies control overall power management by peer-to-peer communication. In some embodiments, the HPM architecture is distributed where there are different supervisors for different domains. One example of a distributed architecture is a tree-like architecture.

In some embodiments, device 5500 comprises Power Management Integrated Circuit (PMIC) 5512, e.g., to implement various power management operations for device 5500. In some embodiments, PMIC 5512 is a Reconfigurable Power Management ICs (RPMICs) and/or an IMVP (Intel® Mobile Voltage Positioning). In an example, the PMIC is within an IC die separate from processor 5504. The may implement various power management operations for device 5500. PMIC 5512 may include hardware interfaces, hardware circuitries, connectors, registers, etc., as well as software components (e.g., drivers, protocol stacks), to implement various power management operations for device 5500.

In an example, device 5500 comprises one or both PCU 5510 or PMIC 5512. In an example, any one of PCU 5510 or PMIC 5512 may be absent in device 5500, and hence, these components are illustrated using dotted lines.

Various power management operations of device 5500 may be performed by PCU 5510, by PMIC 5512, or by a combination of PCU 5510 and PMIC 5512. For example, PCU 5510 and/or PMIC 5512 may select a power state (e.g., P-state) for various components of device 5500. For example, PCU 5510 and/or PMIC 5512 may select a power state (e.g., in accordance with the ACPI (Advanced Configuration and Power Interface) specification) for various components of device 5500. Merely as an example, PCU 5510 and/or PMIC 5512 may cause various components of the device 5500 to transition to a sleep state, to an active state, to an appropriate C state (e.g., CO state, or another appropriate C state, in accordance with the ACPI specification), etc. In an example, PCU 5510 and/or PMIC 5512 may control a voltage output by VR 5514 and/or a frequency of a clock signal output by the clock generator, e.g., by outputting the VID signal and/or the FID signal, respectively. In an example, PCU 5510 and/or PMIC 5512 may control battery power usage, charging of battery 5518, and features related to power saving operation.

The clock generator 5516 can comprise a phase locked loop (PLL), frequency locked loop (FLL), or any suitable clock source. In some embodiments, each core of processor 5504 has its own clock source. As such, each core can operate at a frequency independent of the frequency of operation of the other core. In some embodiments, PCU

5510 and/or PMIC 5512 performs adaptive or dynamic frequency scaling or adjustment. For example, clock frequency of a processor core can be increased if the core is not operating at its maximum power consumption threshold or limit. In some embodiments, PCU 5510 and/or PMIC 5512 determines the operating condition of each core of a processor, and opportunistically adjusts frequency and/or power supply voltage of that core without the core clocking source (e.g., PLL of that core) losing lock when the PCU 5510 and/or PMIC 5512 determines that the core is operating below a target performance level. For example, if a core is drawing current from a power supply rail less than a total current allocated for that core or processor 5504, then PCU 5510 and/or PMIC 5512 can temporality increase the power draw for that core or processor 5504 (e.g., by increasing clock frequency and/or power supply voltage level) so that the core or processor 5504 can perform at higher performance level. As such, voltage and/or frequency can be increased temporality for processor 5504 without violating product reliability.

In an example, PCU 5510 and/or PMIC 5512 may perform power management operations, e.g., based at least in part on receiving measurements from power measurement circuitries 5542, temperature measurement circuitries 5540, charge level of battery 5518, and/or any other appropriate information that may be used for power management. To that end, PMIC 5512 is communicatively coupled to one or more sensors to sense/detect various values/variations in one or more factors having an effect on power/thermal behavior of the system/platform. Examples of the one or more factors include electrical current, voltage droop, temperature, operating frequency, operating voltage, power consumption, inter-core communication activity, etc. One or more of these sensors may be provided in physical proximity (and/or thermal contact/coupling) with one or more components or logic/IP blocks of a computing system. Additionally, sensor(s) may be directly coupled to PCU 5510 and/or PMIC 5512 in at least one embodiment to allow PCU 5510 and/or PMIC 5512 to manage processor core energy at least in part based on value(s) detected by one or more of the sensors.

Also illustrated is an example software stack of device 5500 (although not all elements of the software stack are illustrated). Merely as an example, processors 5504 may execute application programs 5550, Operating System 5552, one or more Power Management (PM) specific application programs (e.g., generically referred to as PM applications 5558), and/or the like. PM applications 5558 may also be executed by the PCU 5510 and/or PMIC 5512. OS 5552 may also include one or more PM applications 5556a, 5556b, 5556c. The OS 5552 may also include various drivers 5554a, 5554b, 5554c, etc., some of which may be specific for power management purposes. In some embodiments, device 5500 may further comprise a Basic Input/output System (BIOS) 5520. BIOS 5520 may communicate with OS 5552 (e.g., via one or more drivers 5554), communicate with processors 5504, etc.

For example, one or more of PM applications 5558, 5556, drivers 5554, BIOS 5520, etc. may be used to implement power management specific tasks, e.g., to control voltage and/or frequency of various components of device 5500, to control wake-up state, sleep state, and/or any other appropriate power state of various components of device 5500, control battery power usage, charging of the battery 5518, features related to power saving operation, etc.

In some embodiments, battery 5518 is a Li-metal battery with a pressure chamber to allow uniform pressure on a battery. The pressure chamber is supported by metal plates (such as pressure equalization plate) used to give uniform pressure to the battery. The pressure chamber may include pressured gas, elastic material, spring plate, etc. The outer skin of the pressure chamber is free to bow, restrained at its edges by (metal) skin, but still exerts a uniform pressure on the plate that is compressing the battery cell. The pressure chamber gives uniform pressure to battery, which is used to enable high-energy density battery with, for example, 20% more battery life.

In some embodiments, pCode executing on PCU 5510*a*/*b* has a capability to enable extra compute and telemetries resources for the runtime support of the pCode. Here pCode refers to a firmware executed by PCU 5510*a*/*b* to manage performance of the 5501. For example, pCode may set frequencies and appropriate voltages for the processor. Part of the pCode are accessible via OS 5552. In various embodiments, mechanisms and methods are provided that dynamically change an Energy Performance Preference (EPP) value based on workloads, user behavior, and/or system conditions. There may be a well-defined interface between OS 5552 and the pCode. The interface may allow or facilitate the software configuration of several parameters and/or may provide hints to the pCode. As an example, an EPP parameter may inform a pCode algorithm as to whether performance or battery life is more important.

This support may be done as well by the OS 5552 by including machine-learning support as part of OS 5552 and either tuning the EPP value that the OS hints to the hardware (e.g., various components of SoC 5501) by machine-learning prediction, or by delivering the machine-learning prediction to the pCode in a manner similar to that done by a Dynamic Tuning Technology (DTT) driver. In this model, OS 5552 may have visibility to the same set of telemetries as are available to a DTT. As a result of a DTT machine-learning hint setting, pCode may tune its internal algorithms to achieve optimal power and performance results following the machine-learning prediction of activation type. The pCode as example may increase the responsibility for the processor utilization change to enable fast response for user activity, or may increase the bias for energy saving either by reducing the responsibility for the processor utilization or by saving more power and increasing the performance lost by tuning the energy saving optimization. This approach may facilitate saving more battery life in case the types of activities enabled lose some performance level over what the system can enable. The pCode may include an algorithm for dynamic EPP that may take the two inputs, one from OS 5552 and the other from software such as DTT, and may selectively choose to provide higher performance and/or responsiveness. As part of this method, the pCode may enable in the DTT an option to tune its reaction for the DTT for different types of activity.

In some embodiments, pCode improves the performance of the SoC in battery mode. In some embodiments, pCode allows drastically higher SoC peak power limit levels (and thus higher Turbo performance) in battery mode. In some embodiments, pCode implements power throttling and is part of Intel's Dynamic Tuning Technology (DTT). In various embodiments, the peak power limit is referred to PL4. However, the embodiments are applicable to other peak power limits. In some embodiments, pCode sets the Vth threshold voltage (the voltage level at which the platform will throttle the SoC) in such a way as to prevent the system from unexpected shutdown (or black screening). In some embodiments, pCode calculates the Psoc,pk SoC Peak Power Limit (e.g., PL4), according to the threshold voltage (Vth). These are two dependent parameters, if one is set, the other can be calculated. pCode is used to optimally set one parameter (Vth) based on the system parameters, and the history of the operation. In some embodiments, pCode provides a scheme to dynamically calculate the throttling level (Psoc, th) based on the available battery power (which changes slowly) and set the SoC throttling peak power (Psoc, th). In some embodiments, pCode decides the frequencies and voltages based on Psoc, th. In this case, throttling events have less negative effect on the SoC performance Various embodiments provide a scheme which allows maximum performance (Pmax) framework to operate.

In some embodiments, VR 5514 includes a current sensor to sense and/or measure current through a high-side switch of VR 5514. In some embodiments the current sensor uses an amplifier with capacitively coupled inputs in feedback to sense the input offset of the amplifier, which can be compensated for during measurement. In some embodiments, the amplifier with capacitively coupled inputs in feedback is used to operate the amplifier in a region where the input common-mode specifications are relaxed, so that the feedback loop gain and/or bandwidth is higher. In some embodiments, the amplifier with capacitively coupled inputs in feedback is used to operate the sensor from the converter input voltage by employing high-PSRR (power supply rejection ratio) regulators to create a local, clean supply voltage, causing less disruption to the power grid in the switch area. In some embodiments, a variant of the design can be used to sample the difference between the input voltage and the controller supply, and recreate that between the drain voltages of the power and replica switches. This allows the sensor to not be exposed to the power supply voltage. In some embodiments, the amplifier with capacitively coupled inputs in feedback is used to compensate for power delivery network related (PDN-related) changes in the input voltage during current sensing.

Some embodiments use three components to adjust the peak power of SoC 5501 based on the states of a USB TYPE-C device 5529. These components include OS Peak Power Manager (part of OS 5552), USB TYPE-C Connector Manager (part of OS 5552), and USB TYPE-C Protocol Device Driver (e.g., one of drivers 5554*a*, 5554*b*, 5554*c*). In some embodiments, the USB TYPE-C Connector Manager sends a synchronous request to the OS Peak Power Manager when a USB TYPE-C power sink device is attached or detached from SoC 5501, and the USB TYPE-C Protocol Device Driver sends a synchronous request to the Peak Power Manager when the power sink transitions device state. In some embodiments, the Peak Power Manager takes power budget from the CPU when the USB TYPE-C connector is attached to a power sink and is active (e.g., high power device state). In some embodiments, the Peak Power Manager gives back the power budget to the CPU for performance when the USB TYPE-C connector is either detached or the attached and power sink device is idle (lowest device state).

In some embodiments, logic is provided to dynamically pick the best operating processing core for BIOS power-up flows and sleep exit flows (e.g., S3, S4, and/or S5). The selection of the bootstrap processor (BSP) is moved to an early power-up time instead of a fixed hardware selection at any time. For maximum boot performance, the logic selects the fastest capable core as the BSP at an early power-up time. In addition, for maximum power saving, the logic selects the most power efficient core as the BSP. Processor or switching for selecting the BSP happens during the boot-up as well as power-up flows (e.g., S3, S4, and/or S5 flows).

In some embodiments, the memories herein are organized in multi-level memory architecture and their performance is governed by a decentralized scheme. The decentralized scheme includes p-unit 5510 and memory controllers. In some embodiments, the scheme dynamically balances a number of parameters such as power, thermals, cost, latency and performance for memory levels that are progressively further away from the processor in the platform 5500 based on how applications are using memory levels that are further away from processor cores. In some examples, the decision making for the state of the far memory (FM) is decentralized. For example, a processor power management unit (p-unit), near memory controller (NMC), and/or far memory host controller (FMHC) makes decisions about the power and/or performance state of the FM at their respective levels. These decisions are coordinated to provide the most optimum power and/or performance state of the FM for a given time. The power and/or performance state of the memories adaptively change to changing workloads and other parameters even when the processor(s) is in a particular power state.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. If the specification states a component, feature, structure, or characteristic "may," "might," or "could" be included, that particular component, feature, structure, or characteristic is not required to be included. If the specification or claim refers to "a" or "an" element, that does not mean there is only one of the elements. If the specification or claims refer to "an additional" element, that does not preclude there being more than one of the additional elements.

Throughout the specification, and in the claims, the term "connected" means a direct connection, such as electrical, mechanical, or magnetic connection between the things that are connected, without any intermediary devices.

The term "coupled" means a direct or indirect connection, such as a direct electrical, mechanical, or magnetic connection between the things that are connected or an indirect connection, through one or more passive or active intermediary devices.

The term "adjacent" here generally refers to a position of a thing being next to (e g , immediately next to or close to with one or more things between them) or adjoining another thing (e.g., abutting it).

The term "circuit" or "module" may refer to one or more passive and/or active components that are arranged to cooperate with one another to provide a desired function.

The term "signal" may refer to at least one current signal, voltage signal, magnetic signal, or data/clock signal. The meaning of "a," "an," and "the" include plural references. The meaning of "in" includes "in" and "on."

The term "analog signal" is any continuous signal for which the time varying feature (variable) of the signal is a representation of some other time varying quantity, i.e., analogous to another time varying signal.

The term "digital signal" is a physical signal that is a representation of a sequence of discrete values (a quantified discrete-time signal), for example of an arbitrary bit stream, or of a digitized (sampled and analog-to-digital converted) analog signal.

The term "scaling" generally refers to converting a design (schematic and layout) from one process technology to another process technology and may be subsequently being reduced in layout area. In some cases, scaling also refers to upsizing a design from one process technology to another process technology and may be subsequently increasing layout area. The term "scaling" generally also refers to downsizing or upsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner For the purposes of the present disclosure, phrases "A and/or B" and "A or B" mean (A), (B), or (A and B). For the purposes of the present disclosure, the phrase "A, B, and/or C" means (A), (B), (C), (A and B), (A and C), (B and C), or (A, B and C).

The terms "left," "right," "front," "back," "top," "bottom," "over," "under," and the like in the description and in the claims, if any, are used for descriptive purposes and not necessarily for describing permanent relative positions.

It is pointed out that those elements of the figures having the same reference numbers (or names) as the elements of any other figure can operate or function in any manner similar to that described but are not limited to such.

For purposes of the embodiments, the transistors in various circuits and logic blocks described here are metal oxide semiconductor (MOS) transistors or their derivatives, where the MOS transistors include drain, source, gate, and bulk terminals. The transistors and/or the MOS transistor derivatives also include Tri-Gate and FinFET transistors, Gate All Around Cylindrical Transistors, Tunneling FET (TFET), Square Wire, or Rectangular Ribbon Transistors, ferroelectric FET (FeFETs), or other devices implementing transistor functionality like carbon nanotubes or spintronic devices. MOSFET symmetrical source and drain terminals i.e., are identical terminals and are interchangeably used here. A TFET device, on the other hand, has asymmetric Source and Drain terminals. Those skilled in the art will appreciate that other transistors, for example, Bi-polar junction transistors (BJT PNP/NPN), BiCMOS, CMOS, etc., may be used without departing from the scope of the disclosure.

Here the term "supervisor" generally refers to a power controller, or power management, unit (a "p-unit"), which monitors and manages power and performance related parameters for one or more associated power domains, either alone or in cooperation with one or more other p-units. Power/performance related parameters may include but are not limited to domain power, platform power, voltage, voltage domain current, die current, load-line, temperature, device latency, utilization, clock frequency, processing efficiency, current/future workload information, and other parameters. It may determine new power or performance parameters (limits, average operational, etc.) for the one or more domains. These parameters may then be communicated to supervisee p-units, or directly to controlled or monitored entities such as VR or clock throttle control registers, via one or more fabrics and/or interconnects. A supervisor learns of the workload (present and future) of one or more dies, power measurements of the one or more dies, and other parameters (e.g., platform level power boundaries) and determines new power limits for the one or more dies. These power limits are then communicated by supervisor p-units to the supervisee p-units via one or more fabrics and/or interconnect. In examples where a die has one p-unit, a supervisor (Svor) p-unit is also referred to as supervisor die.

Here the term "supervisee" generally refers to a power controller, or power management, unit (a "p-unit"), which monitors and manages power and performance related parameters for one or more associated power domains, either alone or in cooperation with one or more other p-units and receives instructions from a supervisor to set power and/or performance parameters (e.g., supply voltage, operating frequency, maximum current, throttling threshold, etc.) for its associated power domain. In examples where a die has one p-unit, a supervisee (Svee) p-unit may also be referred to as a supervisee die. Note that a p-unit may serve either as a Svor, a Svee, or both a Svor/Svee p-unit Here, the term "processor core" generally refers to an independent execution unit that can run one program thread at a time in parallel with other cores. A processor core may include a dedicated power controller or power control unit (p-unit) which can be dynamically or statically configured as a supervisor or supervisee. This dedicated p-unit is also referred to as an autonomous p-unit, in some examples. In some examples, all processor cores are of the same size and functionality i.e., symmetric cores. However, processor cores can also be asymmetric. For example, some processor cores have different size and/or function than other processor cores. A processor core can be a virtual processor core or a physical processor core.

Here the term "die" generally refers to a single continuous piece of semiconductor material (e.g. silicon) where transistors or other components making up a processor core may reside. Multi-core processors may have two or more processors on a single die, but alternatively, the two or more processors may be provided on two or more respective dies. Each die has a dedicated power controller or power control unit (p-unit) power controller or power control unit (p-unit) which can be dynamically or statically configured as a supervisor or supervisee. In some examples, dies are of the same size and functionality i.e., symmetric cores. However, dies can also be asymmetric. For example, some dies have different size and/or function than other dies.

Here, the term "interconnect" refers to a communication link, or channel, between two or more points or nodes. It may comprise one or more separate conduction paths such as wires, vias, waveguides, passive components, and/or active components. It may also comprise a fabric.

Here the term "interface" generally refers to software and/or hardware used to communicate with an interconnect. An interface may include logic and 1/0 driver/receiver to send and receive data over the interconnect or one or more wires.

Here the term "fabric" generally refers to communication mechanism having a known set of sources, destinations, routing rules, topology and other properties. The sources and destinations may be any type of data handling functional unit such as power management units. Fabrics can be two-dimensional spanning along an x-y plane of a die and/or three-dimensional (3D) spanning along an x-y-z plane of a stack of vertical and horizontally positioned dies. A single fabric may span multiple dies. A fabric can take any topology such as mesh topology, star topology, daisy chain topology. A fabric may be part of a network-on-chip (NoC) with multiple agents. These agents can be any functional unit.

Here the term "dielet" or "chiplet" generally refers to a physically distinct semiconductor die, typically connected to an adjacent die in a way that allows the fabric across a die boundary to function like a single fabric rather than as two distinct fabrics. Thus at least some dies may be dielets. Each dielet may include one or more p-units which can be dynamically or statically configured as a supervisor, supervisee or both.

Here the term "domain" generally refers to a logical or physical perimeter that has similar properties (e.g., supply voltage, operating frequency, type of circuits or logic, and/or workload type) and/or is controlled by a particular agent. For example, a domain may be a group of logic units or function units that are controlled by a particular supervisor. A domain may also be referred to an Autonomous Perimeter (AP). A domain can be an entire system-on-chip (SoC) or part of the SoC, and is governed by a p-unit.

Furthermore, the particular features, structures, functions, or characteristics may be combined in any suitable manner in one or more embodiments. For example, a first embodiment may be combined with a second embodiment anywhere the particular features, structures, functions, or characteristics associated with the two embodiments are not mutually exclusive.

While the disclosure has been described in conjunction with specific embodiments thereof, many alternatives, modifications and variations of such embodiments will be apparent to those of ordinary skill in the art in light of the foregoing description. The embodiments of the disclosure are intended to embrace all such alternatives, modifications, and variations as to fall within the broad scope of the appended claims.

In addition, well-known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e.g., circuits) are set forth in order to describe example embodiments of the disclosure, it should be apparent to one skilled in the art that the disclosure can be practiced without, or with variation of, these specific details. The description is thus to be regarded as illustrative instead of limiting.

The following examples pertain to further embodiments. Specifics in the examples may be used anywhere in one or more embodiments. All optional features of the apparatus described herein may also be implemented with respect to a method or process. The examples can be combined in any combinations. For example, example 4 can be combined with example 2.

Example 1: An apparatus comprising: a plurality of processing cores; a first memory controller coupled to one or more first memory modules via a first link; a second memory controller coupled to one or more second memory modules via a second link; and a power management unit coupled to the plurality of processing cores, the first memory controller, and the second memory controller, wherein the power management unit is to determine power and/or performance policy and boundary conditions for the apparatus, and to communicate a power state for the first and/or second links via the first memory controller and/or the second memory controller.

Example 2: The apparatus of any example herein, wherein the second memory controller manages power of the one or more second memory modules via the second link and based on a dynamic profile of workload fed to a memory device, wherein the memory device is coupled to the second memory modules and the second memory controller.

Example 3: The apparatus of example 2, wherein the memory device has precedence over the second memory controller and/or the power management unit to decide the power state of the second link.

Example 4: The apparatus of any example herein, wherein the second memory controller includes a timer to determine exit latency from a power state of the second link, wherein the exit latency is considered by the second memory controller to determine a power state of the second link.

Example 5: The apparatus of any example herein, wherein the power management unit receives memory access pattern hints for an operating system, and provides the memory access pattern hints to the second memory controller, wherein the second memory controller considers the memory access pattern hints to determine a power state of the second link.

Example 6: The apparatus of any example herein, wherein the power and/or performance policy includes Hour of battery life, and quality of service.

Example 7: The apparatus of any example herein, wherein the boundary conditions include power envelope, thermal limit, and maximum supply current.

Example 8: The apparatus of any example herein, wherein the first link is a double data rate link, and wherein the first memory modules comprise dynamic random-access memory.

Example 9: The apparatus of any example herein, wherein the second link is a peripheral component interface express link, wherein the second memory modules have slower exit latency than an exit latency of the first memory modules.

Example 10: The apparatus of any example herein, wherein power state of the first and/or second links is decoupled from power states of the plurality of processing cores.

Example 11: A machine-readable storage media having machine-readable instructions that, when executed, cause one or more machines to perform a method comprising: determining power and/or performance policy and boundary conditions for a processor system; communicating a first power state for a link via a memory controller; dynamically profiling workload feeding a memory device coupled to the memory controller; suggesting a second power state for the link based on the power and/or performance policy and boundary conditions and dynamically profiled workload.

Example 12: The machine-readable storage media of any example herein, wherein the power and/or performance policy includes Hour of battery life, and quality of service.

Example 13: The machine-readable storage media of any example, wherein the first power state for the link is same as the second power state for the link.

Example 14: The machine-readable storage media of any example herein, wherein the first power state for the link is different as the second power state for the link.

Example 15: The machine-readable storage media of any example herein, wherein the second power state takes precedence over the first power state.

Example 16: The machine-readable storage media of any example herein, having machine-readable instructions that, when executed, cause the one or more machines to perform the method comprising: determining exit latency from a power state of the second link; and considering, by the memory controller, the exit latency to determine a power state of the second link.

Example 17: A system comprising: far memory modules; near memory modules; a processor coupled to the far memory modules and the near memory modules; and a wireless device to allow the processor to communicate with another device, wherein the processor includes: a plurality of processing cores; a near memory controller coupled to the near memory modules via a first link; a far memory controller coupled to the far memory modules via a second link; and a power management unit coupled to the plurality of processing cores, the near memory controller, and the far memory controller, wherein the power management unit is to determine power and/or performance policy and boundary conditions for the processor, and to communicate a power state for the first and/or second links via the near memory controller and/or the far memory controller.

Example 18: The system of any example herein, wherein the far memory controller manages power of the far memory modules via the second link and based on a dynamic profile of workload fed to a memory device, wherein the memory device is coupled to the far memory modules and the far memory controller.

Example 19: The system of any example herein, wherein the memory device has precedence over the far memory controller and/or the power management unit to decide the power state of the second link.

Example 20: The system of any example herein, wherein the far memory controller includes a timer to determine exit latency from a power state of the second link, wherein the exit latency is considered by the far memory controller to determine a power state of the second link.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus comprising:
   a plurality of processing cores;
   a first memory controller coupled to one or more first memory modules via a first link;
   a second memory controller coupled to one or more second memory modules via a second link and a second-memory module control circuit device, wherein the one or more second memory modules are second level or higher, writeable non-volatile memory modules; and
   a power management unit coupled to the plurality of processing cores, the first memory controller, and the second memory controller, wherein the power management unit is to determine power and/or performance policy and boundary conditions for the apparatus, and to communicate a power state for the first and/or second links via the first memory controller and/or the second memory controller, wherein the second memory controller manages power of the one or more second memory modules via the second link based on a dynamic profile of workload fed to the second memory controller from the power management unit, and the second-memory module control circuit device manages a second memory module power, performance or thermal state based on second memory module parameters.

2. The apparatus of claim 1, wherein the second-memory device has precedence over the second memory controller and/or the power management unit to decide the power state of the second link.

3. The apparatus of claim 1, wherein the second memory controller includes a timer to determine exit latency from a power state of the second link, wherein the exit latency is considered by the second memory controller to determine a power state of the second link.

4. The apparatus of claim 1, wherein the power management unit receives memory access pattern hints for an operating system, and provides the memory access pattern hints to the second memory controller, wherein the second memory controller considers the memory access pattern hints to determine a power state of the second link.

5. The apparatus of claim 1, wherein the power and/or performance policy includes Hour of battery life, and quality of service.

6. The apparatus of claim 1, wherein the boundary conditions include power envelope, thermal limit, and maximum supply current.

7. The apparatus of claim 1, wherein the first link is a double data rate link, and wherein the first memory modules comprise dynamic random-access memory.

8. The apparatus of claim 1, wherein the second link is a peripheral component interface express link, wherein the second memory modules have slower exit latency than an exit latency of the first memory modules.

9. The apparatus of claim 1, wherein power state of the first and/or second links is decoupled from power states of the plurality of processing cores.

10. A system comprising:
far memory modules;
near memory modules;
a processor coupled to the far memory modules and the near memory modules; and
a wireless device to allow the processor to communicate with another device, wherein the processor includes:
 a plurality of processing cores;
 a near memory controller coupled to the near memory modules via a first link;
 a far memory controller coupled to the far memory modules via a second link; and
 a power management unit coupled to the plurality of processing cores, the near memory controller, and the far memory controller, wherein the power management unit is to determine power and/or performance policy and boundary conditions for the processor, and to communicate a power state for the first and/or second links via the near memory controller and/or the far memory controller, wherein the far memory controller manages power of the far memory modules via the second link and based on a dynamic profile of workload fed to a memory control circuit device, wherein the memory control circuit device is coupled to the far memory modules and the far memory controller.

11. The system of claim 10, wherein the memory device has precedence over the far memory controller and/or the power management unit to decide the power state of the second link.

12. The system of claim 10, wherein the far memory controller includes a timer to determine exit latency from a power state of the second link, wherein the exit latency is considered by the far memory controller to determine a power state of the second link.

\* \* \* \* \*